(12) United States Patent
Le Moigne-Stewart et al.

(10) Patent No.: US 11,308,625 B1
(45) Date of Patent: *Apr. 19, 2022

(54) SYSTEM AND METHOD OF CRATER DETECTION AND REGISTRATION USING MARKED POINT PROCESSES, MULTIPLE BIRTH AND DEATH METHODS AND REGION-BASED ANALYSIS

(71) Applicant: United States of America as represented by the Administrator of NASA, Washington, DC (US)

(72) Inventors: Jacqueline J. Le Moigne-Stewart, Greenbelt, MD (US); David Solarna, Genoa (IT); Gabriele Moser, Genoa (IT); Sebastiano Serpico, Genoa (IT)

(73) Assignee: United States of America as represented by the Administrator of NASA, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/034,186

(22) Filed: Sep. 28, 2020

Related U.S. Application Data

(63) Continuation of application No. 16/128,840, filed on Sep. 12, 2018, now Pat. No. 10,825,182.

(51) Int. Cl.
*G06T 5/00* (2006.01)
*G06T 7/13* (2017.01)
(Continued)

(52) U.S. Cl.
CPC ............... *G06T 7/13* (2017.01); *G06T 5/002* (2013.01); *G06T 5/20* (2013.01); *G06T 7/11* (2017.01);
(Continued)

(58) Field of Classification Search
CPC ..... G06T 7/13; G06T 7/11; G06T 7/337; G06T 7/37; G06T 5/002; G06T 5/20;
(Continued)

(56) References Cited

U.S. PATENT DOCUMENTS

| | | | | |
|---|---|---|---|---|
| 2009/0245638 | A1* | 10/2009 | Collier | G06T 7/11 382/173 |
| 2011/0026832 | A1* | 2/2011 | LeMoigne-Stewart | G06T 7/30 382/199 |
| 2015/0088466 | A1* | 3/2015 | Zhang | G06T 17/05 703/1 |

OTHER PUBLICATIONS

"Planetary crater detection and registration using marked point processes, graph cut algorithms, and wavelet transforms" Jul. 23-28, 2017 (Year: 2017).*

(Continued)

*Primary Examiner* — Syed Haider
(74) *Attorney, Agent, or Firm* — Heather Goo; Bryan A. Geurts; Helen M. Gaius

(57) ABSTRACT

The present invention relates to a novel method and system for crater detection in planetary data based on marked point processes (MPP), effective for various object detection tasks in Earth observation, and for planetary image registration. The resulting spatial features are exploited for registration, together with fitness functions based on the MPP energy, on the mean directed Hausdorff distance, and on the mutual information. Two different methods—one based on birth-death processes and region-of-interest analysis, and the other based on graph cuts and decimated wavelets—are included within the present framework. Experimental results confirmed the effectiveness of the present invention in terms of crater detection performance and sub-pixel registration accuracy.

8 Claims, 16 Drawing Sheets
(7 of 16 Drawing Sheet(s) Filed in Color)

(51) Int. Cl.
*G06T 5/20* (2006.01)
*G06T 7/11* (2017.01)
*G06T 7/33* (2017.01)
*G06T 7/37* (2017.01)

(52) U.S. Cl.
CPC ............... *G06T 7/337* (2017.01); *G06T 7/37* (2017.01); *G06T 2207/10032* (2013.01); *G06T 2207/20016* (2013.01); *G06T 2207/20132* (2013.01); *G06T 2207/30181* (2013.01)

(58) Field of Classification Search
CPC . G06T 2207/20016; G06T 2207/10032; G06T 2207/30181; G06T 2207/20132
See application file for complete search history.

(56) References Cited

OTHER PUBLICATIONS

"Planetary Crater Detection and Registration Using Marked Point Processes, Multiple Birth and Death Algorithms, and Region-based Analysis" Jul. 2017. (Year: 2017).*

* cited by examiner

Example of a crater modeled as an ellipse.

FIG 4: Birth map and ROI from a planetary image: (a) Edge contours superimposed to the input image; (b) result of the generalized Hough accumulator; (c) centroids obtained by clustering the accumulator centers; (d) birth map shown by shading the image in proportion to $B(s)$ $(s \in S)$ FIG. 4(e)
FIG. 4(f)
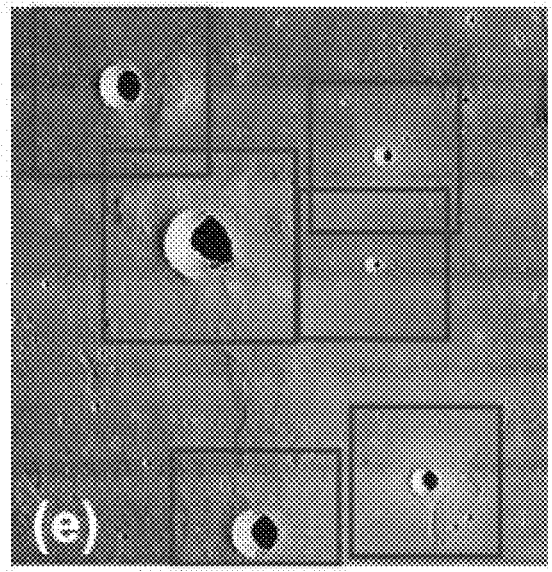
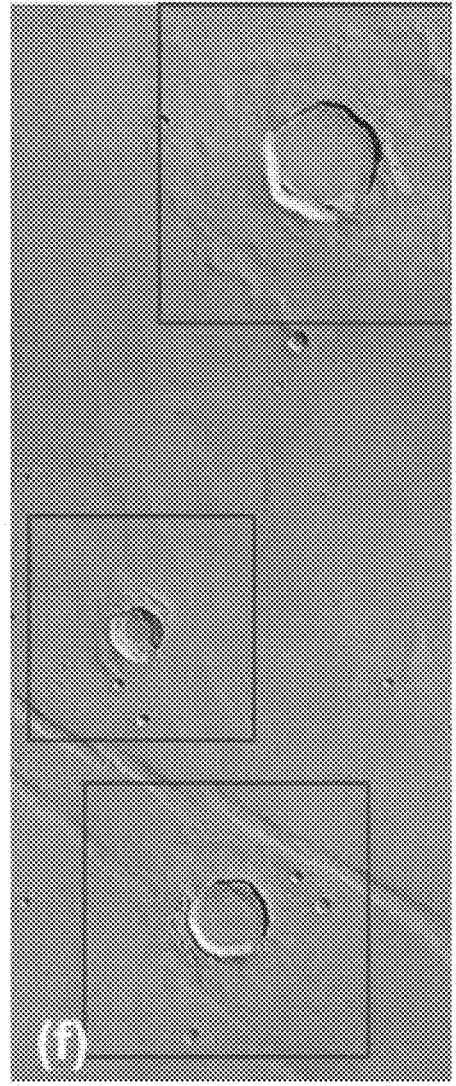
FIG 4: (e) regions of interest (red boxes). A second example from another camera image is shown in (f)

SYSTEM AND METHOD OF CRATER DETECTION AND REGISTRATION USING MARKED POINT PROCESSES, MULTIPLE BIRTH AND DEATH METHODS AND REGION-BASED ANALYSIS

This is a continuation application of U.S. Ser. No. 16/128,840 entitled "SYSTEM AND METHOD OF CRATER DETECTION AND REGISTRATION USING MARKED POINT PROCESSES, MULTIPLE BIRTH AND DEATH METHODS AND REGION-BASED ANALYSIS" filed on Sep. 12, 2018 and it's contents are hereby incorporated herein by reference in it's entirety.

ORIGIN OF THE INVENTION

The invention described herein was at least in-part made by an employee of the United States Government and may be manufactured or used by or for the Government of the United States of American for governmental purposes without the payment of any royalties thereon or therefor.

BACKGROUND OF THE INVENTION

1. Field of the Invention

The present invention relates to a system and method of registration of planetary images using a novel two-stage approach: first, craters are detected by using a marked point process (MPP) model optimized through either a birth-and-death or a birth-and-cut sampling process; then second, image registration is accomplished by matching the extracted craters through the optimization of distance and by refining the obtained partial result through the optimization of an information-theoretic function.

2. Description of the Related Art

Planetary science is continuously evolving, and with new science and exploration goals, large amounts of data need to be analyzed and integrated. An increasing number of images have been collected by different planetary missions over the past few decades, but the collected data exhibit different characteristics that depend on the kind of sensor employed, the time of acquisition, the illumination conditions, etc. To benefit from the wealth of information provided by these multiple data sets, (semi) autonomous and fast registration is necessary, since it allows the comparison and fusion of data acquired by different sensors and/or at different times.

In this field, data heterogeneity is an important issue. Because of the large variety of sensors and spacecraft collecting data, planetary science needs to integrate various multi-sensor and multitemporal images.

The characteristics of these multimodal data depend on the kind of sensor, the observation time, the acquisition geometry, etc. Sensors collecting images have different characteristics, such as different resolutions or different operating spectra; moreover, they do not always operate under the same conditions, and images of the same area may be different because of different illumination or acquisition time. Since images have to be aligned in the same reference system to be compared and analyzed, one of the primary needs is image registration, and automatic and robust processing techniques need to be used.

Image registration relates to processing a pair of images—an input image and a reference image—in order to determine the transformation to be applied to the input image for it to be referenced in the same reference system of the reference. The transformation is generally found by maximizing the matching between features extracted from the images to be registered.

As noted above, since manual operations are time consuming, and due to the increase of planetary data sets, image registration needs to be automated. Thus, semi-automatic and efficient registration is important step for a better analysis of these images, since it allows data acquired by different sensors, or at different times, to be compared and jointly used.

Image registration steps include feature detection, feature matching, transformation model estimation, and image transformation. Feature detection can include manual or automatic detection of salient or distinctive objects. Feature matching can include establishing correspondence between features. Transformation model estimation can include estimating a type of model and parameters of the mapping function. Image transformation can include transforming the input image.

More specifically, feature extraction in planetary images is often manually performed by human experts, which is a very time-consuming endeavor. Indeed, the identification of spatial features on planetary surfaces is often a difficult task; the amount of available data is usually limited, planetary images generally present low contrast (being heavily affected by illumination, surface properties, and atmospheric state), and some spatial features can be barely visible. Among the typical spatial structures that characterize planetary surfaces, craters are of primary importance.

Previous methods for crater detection can be divided into three broad categories: 1) supervised algorithms requiring input pre-labeled data; 2) unsupervised methods using image processing techniques and possibly user-interaction but no training data; and 3) hybrid techniques mixing unsupervised and supervised concepts in a pipeline structure.

Focusing first on prior art supervised methods, these include a continuously scalable template-matching algorithm, as well as various supervised learning algorithms, including ensemble methods, support vector machines (SVM), and continuously scalable template models, employed to derive crater detectors from ground-truth images. The SVM approach with normalized image patches provided detection and localization performance closest to that of human labelers and was found more accurate than boundary-based approaches such as the Hough transform (discussed below). Another approach included a supervised boosting algorithm built up from the solution proposed for face recognition.

Prior art unsupervised techniques are generally based on the identification of circular or elliptical shapes in the image by using edge information. A consolidated approach is based on the generalized Hough transform (GHT). Another approach included a crater detection method based on the analysis of the probability volume created as a result of a template-matching procedure that approximated the craters as circular objects. Other approaches included texture analysis and ellipse fitting. One unsupervised method for the extraction of elliptical objects, such as craters and rocks of compact shape (e.g., boulders), to be used for registration, combined image filtering, edge detection, watershed segmentation, and GHT.

Hybrid combinations of supervised and unsupervised techniques are used in the prior art. In one method, to automatically detect craters on a planet, edge detection, template matching, and supervised neural networks for the recognition of false positives were integrated. Another example can be found where mathematical morphology was used for the detection of craters, and supervised techniques were used to distinguish between objects and false alarms.

Among other prior art approaches, a convolutional neural network method is used, as well as a method where Haar-like textural features are extracted from pairs of shaded/highlighted regions, to train an SVM.

With a wide spectrum of applications to diverse categories of data, prior art image registration has evolved into a complex and challenging problem for which many solution strategies have been proposed. The growing availability of digital imagery in remote sensing, medicine, and numerous other areas has driven a substantial increase in research in image registration over the past 20 years.

In previous methods, the problem of image registration is generally characterized as area-based or feature-based. In area-based algorithms, areas or regions of the original image data are matched with minimal preprocessing or with preprocessing that preserves most of the image data. In feature-based algorithms, on the other hand, the original images are preprocessed to extract distinctive, highly informative features that are used for matching. The most used methods include: 1) manual registration, 2) correlation-related methods, based on the measure of correlation between regions of the two images, 3) Fourier-domain and other transform-based methods, such as Wavelet transforms, 4) mutual information and distribution-based approaches, 5) feature-point methods, including control points, ground control points, tie-points, and landmarks, and 6) contour- and region-based approaches.

Contour-based image registration techniques can be categorized with respect to the similarity measure they use. One approach is to apply binary correlation to edge points even though these measures do not allow significant local distortions in the feature sets. The Hausdorff distance, which evaluates a match based on the greatest remaining outliers, was proven more accurate for registration. In one technique, efficient ways to compute the Hausdorff distance were proposed, and another method tested the technique on Landsat images using the original formulation, which made use of a branch and bound algorithm, along with a Monte Carlo variation to accelerate the search. Another variation was a multilevel algorithm, which applied the Hausdorff metric with bi-tree search to a pyramid of edge maps in order to compute a rough alignment and refined to subpixel accuracy using tie-points.

However, one drawback of using the Hausdorff distance as a similarity measure is that computing the optimal alignment of two-point sets is computationally intensive. In an attempt to alleviate this complexity, some researchers have considered alignment-based algorithms. These algorithms use alignments between small subsets of points to generate potential aligning transformations, the best of which are then subjected to more detailed analysis.

For remote sensing applications, it is important that the distance measure be robust, i.e., it should be insensitive to a significant number of feature points from either set that have no matching points in the other set. Examples of robust distance measures include the partial Hausdorff distance (PHD), the mean directed Hausdorff distance (MDHD), and measures involving the symmetric and absolute differences.

Other possible frameworks are represented by the random sample consensus (RANSAC) algorithm, or by voting and accumulation schemes (like the aforementioned Hough transform) to find the most likely transformation within a set of potential matchings. Further registration methods include where a line segment extractor and a Distribution of Edge Pixels Along Contour (DEPAC) descriptor are used, respectively.

However, because of the large variety of sensors and spacecrafts collecting data, and the drawbacks of the above prior art techniques, better integration of the numerous multi-modal image sources is needed to improve the available data sets for future missions.

To that end, a new method of semi-automatic registration of planetary images using feature-based approaches, where an effective spatial feature extraction (i.e., the extraction of spatial characteristics from the imaged scene) can be performed, is needed.

SUMMARY OF THE INVENTION

The present invention relates to a system and method of registration of planetary images using a novel two-stage approach: first, craters are detected by using a marked point process (MPP) model optimized through either a birth-and-death or a birth-and-cut sampling process; then second, image registration is accomplished by matching the extracted craters through the optimization of distance and by refining the obtained partial result through the optimization of an information-theoretic function.

In order to overcome the typical problems of planetary images with limited contrast, poor illumination, and a lack of good features, an unsupervised approach for the extraction of planetary craters, based on a marked point process (MPP) is employed in the present invention. The framework is stochastic and the goal is to minimize an energy function on the state space of all possible configurations of objects (craters), using either a multiple-birth-and-death (MBD) method or a multiple-birth-and-cut (MBC) method. The two methods of the present invention—i.e., MBC and MBD—differ in the MPP energy minimization strategy and in the integration of either region-based analysis or multiscale wavelets.

After feature extraction, the registration technique proceeds as follows: first, a generalized pattern search or a genetic algorithm minimize an energy function that matches the features extracted from the two images to be registered; then, the maximization of the area-based mutual information (MI) between the two images is performed in a smaller search space using simulated annealing. This two-step process aims at jointly combining the accuracy of MI-based registration, sensitivity to the main spatial features in the input data, and computational efficiency.

The above methods have been experimentally validated with real and semi-synthetic data from Mars and Lunar missions. The methods of the present invention have achieved accurate results with both TIR and visible Mars images. High detection accuracies with low false-positive rates were obtained by both methods. In particular, the methods of the present invention provided more accurate performances than those of previous techniques based on generalized Hough transforms and watershed segmentation.

From the viewpoint of the application to planetary data, as compared to previous works on crater detection from planetary imagery, the methods of the present invention have the additional advantage of providing more information than just the crater boundary, i.e., they explicitly estimate the coordinates of the crater centers, the size of their axes, and consequently their eccentricity. This is obtained by modeling craters as an MPP of elliptical objects in the image plane, as these features are determined as a natural by-product of MPP inference. From the perspective of MPP modeling, the accuracies obtained with the present invention are comparable to those achieved in previous MPP applications to object detection in Earth observation. This scenario confirms the role of marked point processes (MPPs) as powerful modeling tools for complex detection tasks involving a population of randomly arranged objects, even in situations, such as the addressed crater detection problem, in which the target objects are generally affected by shadows and uneven illumination.

In one embodiment, a system to detect craters on a planetary surface includes: a sensor which captures images on the planetary surface, as input images; a pre-processing module which crops the input images and reference images, and reduces noise and extracts contours from the input images and the reference images; a crater extraction module which reduces and transforms image data from the pre-processing module, and performs energy minimization on the input images and the reference images using marked point processes (MPP), combined with one of a multiple-birth-and-death or multiple-birth-and-cut method; wherein the crater-based image registration module performs a first registration by one of a crater-to-contour registration or a crater-to-crater registration; wherein the crater-to-contour registration includes matching the craters extracted from the reference images with edge contours extracted from the input images; and wherein crater-to-crater registration includes matching the craters extracted from both the reference images and the input images; and a mutual information-based image registration module which performs a second registration by maximizing mutual information between the reference images and the input images to achieve a final transformation and registered images.

In one embodiment, the pre-processing module further includes: an edge detector which extracts the contours from the input images and the reference images.

In one embodiment, the pre-processing module further includes: a noise filter which reduces the noise by applying a Gaussian filtering to the input images and the reference images.

In one embodiment, the system further includes: a spacecraft having: a storage which stores the image data on the input images; and an onboard processing system which retrieves the input images from the storage and transfers them to a ground segment.

In one embodiment, the ground segment includes: an antenna which receives the image data from the onboard processing system and forwards the image data to the pre-processing module; a plurality of image registration modules including the crater detection module, the crater-based image registration module, and the mutual information-based image registration module; and at least one storage which stores the input images, the reference images, and the registered images.

In one embodiment, the sensor includes an imaging system, such as a thermal emission imaging system or a camera.

In one embodiment, a method of detecting craters on a planetary surface includes: capturing images of a planetary surface using a sensor, as input images; cropping the input images and reference images using a pre-processing module; reducing noise and extracting contours from said input images and the reference images using the pre-processing module; performing data reduction and transformation of the image data from the pre-processing module using a crater extraction module, and performing energy minimization on the input images and the reference images using marked point processes (MPPs), combined with one of a multiple-birth-and-death or multiple-birth-and-cut method; performing a first registration using the crater extraction module, by one of a crater-to-contour registration or a crater-to-crater registration; wherein the crater-to-contour registration includes matching the craters extracted from the reference images with edge contours extracted from the input images; and wherein crater-to-crater registration includes matching the craters extracted from both the reference images and the input images; performing a second registration using a mutual information-based image registration module, by maximizing mutual information between the reference images and the input images to achieve a final transformation and registered images.

In one embodiment, the data reduction and transformation is performed using one of a region of interest or a discrete wavelet transform method.

In one embodiment, one of the multiple-birth-and-death (MBD) method or the multiple-birth-and-cut (MBC) method is performed after the region of interest method.

In one embodiment, the discrete wavelet transform method is used with the multiple-birth-and-cut (MBC) method, where a multiscale pyramidal decomposition method is used iteratively on the input images. Starting from coarse resolution to original data, the craters are extracted, and the first step registration is obtained with progressively finer result.

In one embodiment, the method further includes: applying a marked point process (MPP) to contour images achieved by the data reduction and transformation of the input images and the reference images.

In one embodiment, the crater-to-crater registration includes mapping of the reference images and the input images to be registered, as a rotational scale translation (RST).

In one embodiment, the second registration includes maximization of mutual information between the reference images and the input images by using simulated annealing.

In one embodiment, the cropping of the input images and the reference images removes artifacts and border effects.

Thus, has been outlined, some features consistent with the present invention in order that the detailed description thereof that follows may be better understood, and in order that the present contribution to the art may be better appreciated. There are, of course, additional features consistent with the present invention that will be described below and which will form the subject matter of the claims appended hereto.

In this respect, before explaining at least one embodiment consistent with the present invention in detail, it is to be understood that the invention is not limited in its application to the details of construction and to the arrangements of the components set forth in the following description or illustrated in the drawings. Methods and apparatuses consistent with the present invention are capable of other embodiments and of being practiced and carried out in various ways. Also, it is to be understood that the phraseology and terminology employed herein, as well as the abstract included below, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the methods and apparatuses consistent with the present invention.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The descriptions of the drawings are only exemplary embodiments of the disclosure and not to be considered as limiting in scope.

FIGS. 4(a)-4(f) show a birth map and region-of-interest (ROI) from planetary images taken by a sensor (i.e., thermal emission imaging system (THEMIS)) of a spacecraft), according to one embodiment consistent with the present invention.

FIG. 4(a) shows contours derived from a Canny edge detector, superimposed on the input image, according to one embodiment consistent with the present invention.

FIG. 4(b) shows the result of the generalized Hough accumulator, according to one embodiment consistent with the present invention.

FIG. 4(c) shows the centroids obtained by clustering the accumulator centers, according to one embodiment consistent with the present invention.

FIG. 4(d) shows a birth map (s) (s∈$\mathcal{S}$ 62 ) shown by shading the image in proportion to (s) (s∈$\mathcal{S}$ 62 ), according to one embodiment consistent with the present invention.

FIG. 4(e) shows regions of interest (ROI) (in boxes), according to one embodiment consistent with the present invention.

FIG. 4(f) shows a second example from a camera from the spacecraft (i.e., a high/super resolution stereo color imager (HRSC)), according to one embodiment consistent with the present invention.

FIG. 7(a) shows the results obtained by multiple-birth-and-death methods (R-MBD); and FIG. 7(b) shows the results obtained by the multiple-birth-and-cut methods (W-MBC). Craters are shown in black lined circles.

FIG. 11(a) shows the reference image; FIG. 11(b) shows the input image; FIG. 11(c) shows the checkerboard composite of the reference and registered input images; FIG. 11(d) shows the zoom on a detail of the checkerboard composite of FIG. 11(c).

FIG. 12(a) shows the reference image; FIG. 12(b) shows the input image; FIG. 12(c) shows the checkerboard composite of the reference and registered input images; FIG. 12(d) shows the zoom on a detail of the checkerboard composite of FIG. 12(c).

FIG. 13(a) shows the reference image; FIG. 13(b) shows the input image; FIG. 13(c) shows the checkerboard composite of the reference and registered input images; FIG. 13(d) shows the zoom on a detail of the checkerboard composite of FIG. 13(c).

DESCRIPTION OF THE INVENTION

The present invention relates to a novel system and method of semi-automatic registration of planetary images using a novel two-stage approach: first, craters are detected by using a marked point process (MPP) model optimized through either a birth-and-death or a birth-and-cut sampling process; then second, image registration is accomplished by matching the extracted craters through the optimization of distance and by refining the obtained partial result through the optimization of an information-theoretic function.

The present invention jointly addresses the problems of semi-automatic registration of pairs of planetary images collected by a passive sensor, and of detection of the craters in the imaged scene. These two goals are interconnected, because contour features (the outlines of the craters) are of primary importance for registration.

Space and Ground Systems Overview

Figure 1:
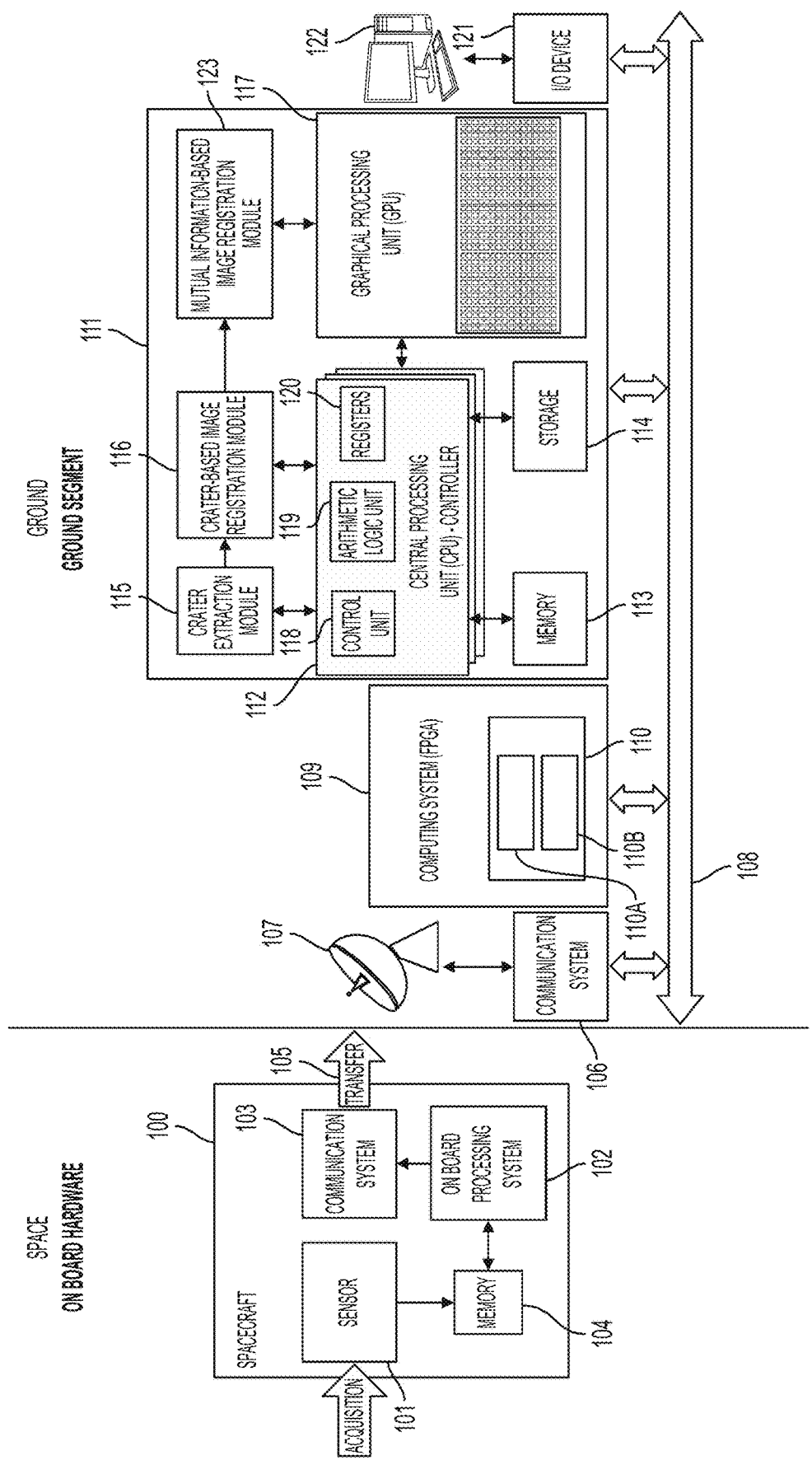
FIG. 1 depicts a schematic layout of the on-board hardware of a spacecraft which communicates with a ground segment, in a system of registration of planetary images, according to one embodiment consistent with the present invention.
Figure 2:
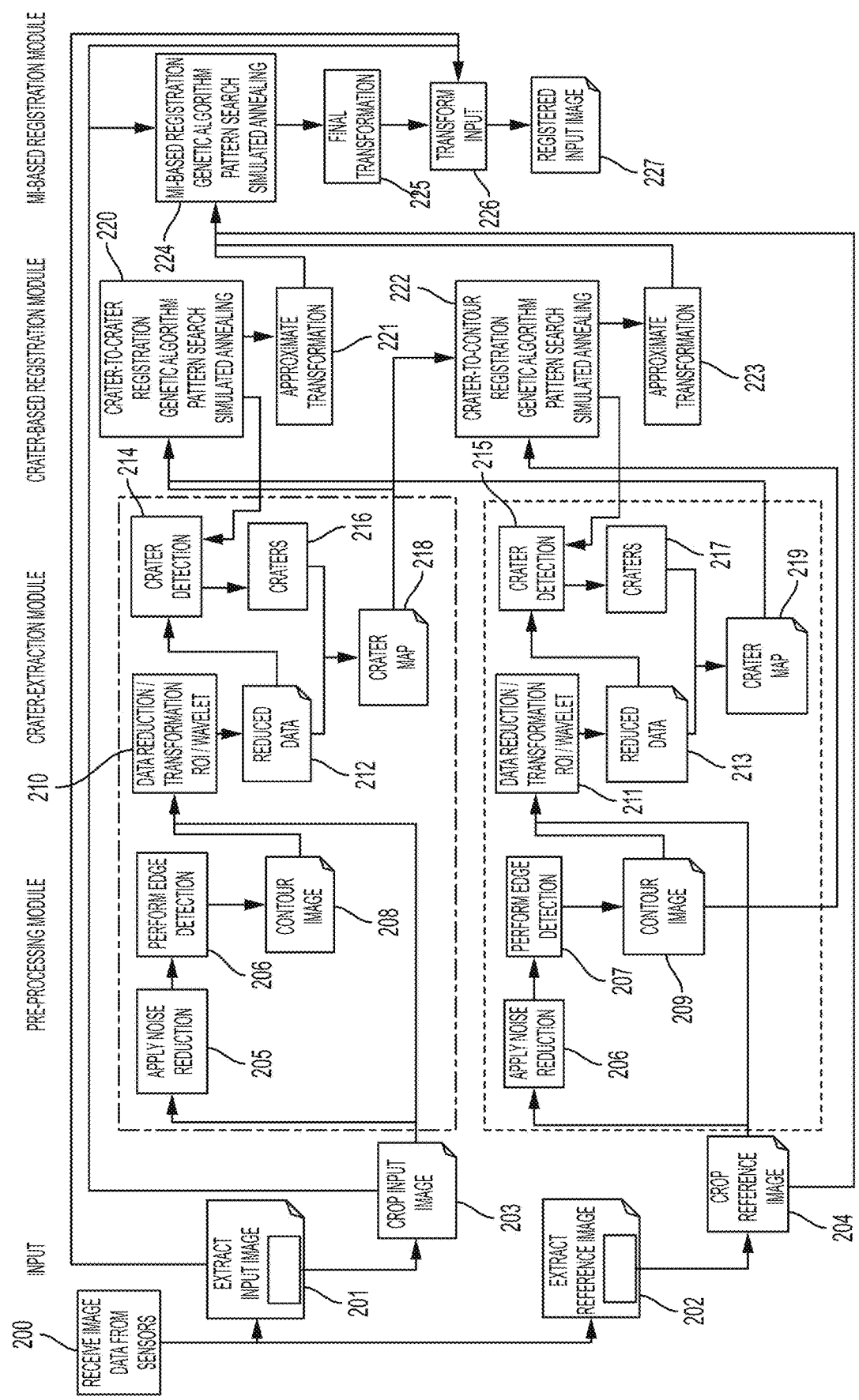
FIG. 2 depicts a schematic layout of the process modules to measure craters, according to one embodiment consistent with the present invention.

In one embodiment, the present invention includes a spacecraft 100 (see FIG. 1) having two modules: 1) a propulsion module containing tanks, thrusters, and associating plumbing, and 2) an equipment module composed of an equipment deck that supports engineering components and a science deck. In one embodiment, the science deck supports a plurality of subsystems including, but not limited to: imaging subsystems 101 (i.e., sensors 101 such as the thermal emission imaging system (THEMIS), or a high/super resolution stereo color imager (HRSC), or other), a gamma ray spectrometer (GRS), a radiation environment experiment, high-energy neutron detector (HEND), a neutron spectrometer, star cameras, etc.

In one embodiment, the imaging subsystem 101 may include the THEMIS, which is a combined infrared and visible multi-spectral pushbroom imager (i.e., a visible imaging camera acquiring data at the resolution of 18 m and an infrared camera with spatial resolution of 100 m), which includes a three-mirror anastigmatic telescope, a visible/infrared beamsplitter, a silicon focal plane for visible detection, and a microbolometer for infrared detection. Infrared data is collected by the imaging subsystem 101, for example, in 9 wavelengths centered from 6.6 to 15.0 microns at 100 meter per pixel resolution, and the 6.6 micron band is collected twice to result in a 10 band image. Visible data is collected by the imaging subsystem 101, for example, in 5 spectral bands at a resolution of 18 meters per pixel.

In one embodiment, the imaging system 101 is a camera system, such as the HRSC stereoscopic camera 101 (which acquires images with a resolution between 10 m and 30 m), which takes accurate and detailed photographs of the planetary surface to reveal detail as small as 2 m, for example. The images are used to produce a geological map showing the location of different minerals and rock types.

The spacecraft 100 includes a plurality of other features (not shown), including but not limited to a high-gain antenna which receives and transmits radio signals between the spacecraft 100 and Earth, and during science operations, collects data from a planetary surface and points toward Earth for communications; an ultra-high frequency (UHF) antenna which collects data from a lander on a planetary surface; a solar array; and sensors for controlling the spacecraft 100.

In one embodiment, the spacecraft 100 includes a command and data handling subsystem 102, which includes an in-flight reconfigurable Field Programmable Gate Array (FGPA)-based (using computer cards) on-board hybrid science data processing system (i.e., the NASA Goddard SpaceCube™ system). The FGPA-based interface electronics improves on-board computing power while lowering relative power consumption and costs.

In one embodiment, the data processing system of the command and data handling subsystem 102 includes a computer with random-access-memory (RAM) and non-volatile memory, and the data processing system runs the flight software and controls the spacecraft 100 through the FGPA-based interface electronics. In particular, communication between the command and data handling subsystem 102 and sensors (not shown) allows the measurement of the spacecraft's 100 orientation in space, or "attitude", and the science instruments of the electronics interface are handled via another interface card of the command and data handling subsystem 102.

In one embodiment, the interface electronics of the command and data handling subsystem 102 communicate with external peripherals, such as antennas and sensor arrays (not shown). A master input/output computer card of the electronics interface collects signals from around the spacecraft 100 and sends commands to the electrical power subsystem.

In one embodiment, another interface card is a mass memory card 104 (shown separately in FIG. 1) that is used to store imaging data collected by the imaging subsystems 101.

In one embodiment, the spacecraft 100 orbits a planetary body, such as the Moon or Mars, and the imaging subsystem 101, which provides digital data collection and processing, takes images of the planetary surface, particularly images of the craters on the planetary surface, which images are stored in the memory 104 by the command data and handling subsystem 102.

The interface between the command and data handling system 102 to a telecommunications subsystem 103 is handled through an uplink/downlink card of the interface electronics. In one embodiment, the telecommunications subsystem 103 includes a radio system operating in the X-band microwave frequency range, and a system that operates in the ultra-high frequency (UHF) range (not shown). The X-band system is used for communications between Earth and the spacecraft 100, and the UHF system is used for communications between the spacecraft 100 and any landers present on another planetary surface. The telecommunications subsystem 103 provides communication capability at all times.

In one embodiment, the telecommunications subsystem 103 communicates via a data transfer 105 with a Ground Segment (FIG. 1), which includes equipment for tracking, data acquisition, and support of all spacecraft 100. In particular, the Ground Segment includes a ground network linked by voice and data communications systems, that can operate in real-time. The Ground Segment includes ground terminal communications relay equipment 106 for the command, telemetry, tracking and control of the spacecraft 100.

In one embodiment, the Ground Segment includes a Ku-band dish antenna 107 which collects data from the spacecraft 100 and passes it through the ground terminal communications system 106 to a communications network 108 (bus) connected to one or more computing devices 109, 110 which process the data.

Thus, in one embodiment, the images stored in memory 104 are processed by a processor of the command and data handling system 102 and transferred in a data stream 105 by the communications subsystem 103 to the Ground Segment dish antenna 107. The imaging data is received by the dish antenna 107, and the data is forwarded by the Ground Segment communications system 106 via network 108 to one or more Ground computing devices 109, 111 for image processing.

In one embodiment, a Ground computing device 109 includes a pre-processing module 110, including a high-performance FPGA, such as a Virtex® or Xilinx® UltraScale™ architecture or modified architecture, which uses both monolithic and next-generation stacked silicon interconnect (SSI) technology. High digital signal processing (DSP) and block RAM-to-logic ratios and next-generation transceivers, combined with low-cost packaging, enable an optimum blend of capability and cost. In one embodiment, the computing device 109 improves the underlying computer technology by achieving the highest system capacity, highest transceiver bandwidth, highest on-chip and in-package memory and high performance to address key market and application requirements through integration of various system-level functions.

In one embodiment, the pre-processing module 110 includes a noise filter 110A, an edge detector 110B.

In one embodiment, the FPGA of the pre-processing module 110 of the ground computing device 109 utilizes a computer processing unit (CPU) (i.e., controller) which runs a program containing software, and a system bus (not shown), that couples various system components including a memory, such as a read-only memory and random-access-memory (RAM) (not shown). Other system or external memory may be available for use as well.

In one embodiment, the computing device 109 is not a part of Ground computing device 111, but is a stand-alone computing device 109 connected to computing device 111.

In one embodiment, the computing device 111 which processes the data from the spacecraft 100 (and/or from the computing device 109), includes a controller/CPU 112 (such as an Intel Core i5 at 3.2 GHz, or other) controlled by a software program, and a system bus that couples various system components including a system memory 113 (such as a read-only memory and random access memory (RAM)), additional memory, such as a secondary storage 114 (including at least 1 GB of free space), as well as other modules specifically designed for particular operations, such as a crater extraction module 115, a crater-based image registration module 116, a mutual information-based registration module 123, and a graphical processing unit (GPU) 117 (such as a Nvidia K40, Tesla K40M, etc.). In one embodiment, the controller 111 includes a control unit 118 scheduling the operations inter and intra modules, arithmetic logic unit 119 performing computations, and registers 120 minimizing delays and which speed-up the process. Those elements cooperate to optimize all the operations and improve the computer's underlying technology, using techniques such as caching, prefetching for memory and advanced branch predictors. The elements improve the performances taking advantage of the principle of locality, thus, preparing fast access to the values used repeatedly and holding frequently used quantities. A more detailed description is provided later.

Computer Systems Overview

It can be appreciated that the present invention may operate on computing devices with more than one CPU or on a group or cluster of computing devices networked together to provide greater processing capability.

The CPUs for computing devices 109, 111, for example, may include a CPU controlled by software, as well as a special-purpose processor. Particular functionality may also be built into the design of a separate computer chip. Of course, computing devices 109, 111 may include any CPU and a module configured to control the CPU (i.e., control unit 118), as well as a special-purpose processor where software is effectively incorporated into the actual processor design.

A processing unit (i.e., computing devices 109, 111) may essentially be a completely self-contained computing device, containing one or multiple cores or CPUs, a bus, a memory, a control unit or controller, cache, etc. A multi-core processing unit may be symmetric or asymmetric.

The system bus may be any of several types of bus structures including a memory bus or memory controller, a peripheral bus, and a local bus using any of a variety of bus architectures. A basic input/output (BIOS) stored in ROM or the like, may provide the basic routine that helps to transfer information between elements within the computing device 109, 111 such as during start-up. The computing device 109, 111 further includes storage devices such as a hard disk drive, a magnetic disk drive, an optical disk drive, tape drive or the like. The storage device is connected to the system bus by a drive interface. The drives and the associated computer readable media provide nonvolatile storage of computer readable instructions, data structures, program modules and other data for the computing device 109, 111. In one aspect, a hardware module that performs a particular function includes the software component stored in a tangible computer-readable medium in connection with the necessary hardware components, such as the CPU, bus, display, and so forth, to carry out the function. The computer components should be known to those of skill in the art and appropriate variations are contemplated depending on the type of device, such as whether the device is a small, handheld computing device, a desktop computer, or a computer server.

Although the exemplary environment described herein may employ a hard disk, it should be appreciated by those skilled in the art that other types of computer-readable media which can store data that are accessible by a computer, such as magnetic cassettes, flash memory cards, digital versatile disks, cartridges, random access memories (RAMs), read only memory (ROM), a cable or wireless signal containing a bit stream and the like, may also be used in the exemplary operating environment.

To enable user interaction with the computing device 109, 111 an input device 121 represents any number of input mechanisms, such as a microphone for speech, a touch-sensitive display screen 122 for gesture or graphical input, keyboard, mouse, motion input, speech and so forth. The input may be used by the presenter to indicate the beginning of a speech search query. The device output can also be one or more of a number of output mechanisms known to those of skill in the art. In some instances, multimodal systems enable a user to provide multiple types of input to communicate with the computing device 109, 111. The communications interface generally governs and manages the user input and system output. There is no restriction on the invention operating on any particular hardware arrangement and therefore the basic features here may easily be substituted for improved hardware or firmware arrangements as they are developed.

For clarity of explanation, the illustrative system embodiment is presented as comprising individual functional blocks (including functional blocks labeled as a "CPU" 112, "GPU" 117, etc.). The functions these blocks represent may be provided through the use of either shared or dedicated hardware, including, but not limited to, hardware capable of executing software and hardware, such as a processor, that is purpose-built to operate as an equivalent to software executing on a processor. For example, the functions of one or more processors presented in FIG. 1 may be provided by a single shared processor or multiple processors. (Use of the term "processor" should not be construed to refer exclusively to hardware capable of executing software.) Illustrative embodiments may comprise microprocessor and/or digital signal processor (DSP) hardware, read-only memory (ROM) for storing software performing the operations discussed below, and random-access memory (RAM) for storing results. Very large-scale integration (VLSI) hardware embodiments, as well as custom VLSI circuitry in combination with a DSP circuit, may also be provided.

The logical operations of the various embodiments are implemented as: (1) a sequence of computer implemented steps, operations, or procedures running on a programmable circuit within a computer, (2) a sequence of computer implemented steps, operations, or procedures running on a specific-use programmable circuit; and/or (3) interconnected machine modules or program engines within the programmable circuits.

According to one embodiment, the present invention may be implemented using software applications that reside in a client and/or server environment. According to another embodiment, the present invention may be implemented using software applications that reside in a distributed system over a computerized network and across a number of client computer systems. Thus, in the present invention, a particular operation may be performed either at the client computer, the server, or both. While the system of the present invention may be described as performing certain functions, one of ordinary skill in the art will readily understand that the program may perform the function rather than the entity of the system itself. According to one embodiment of the invention, the program that runs the system may include separate programs having code that performs desired operations. According to one embodiment, the program that runs the system may include a plurality of modules that perform sub-operations of an operation or may be part of a single module of a larger program that provides the operation. Further, although the above-described features and processing operations may be realized by dedicated hardware or may be realized as programs having code instructions that are executed on data processing units, it is further possible that parts of the above sequence of operations may be carried out in hardware, whereas other of the above processing operations may be carried out using software.

According to one embodiment of the invention, the server may include a single unit or may include a distributed system having a plurality of servers or data processing units. The server(s) may be shared by multiple users in direct or indirect connection to each other. The server(s) may be coupled to a communication link that is preferably adapted to communicate with a plurality of client computers. Although the above physical architecture has been described as client-side or server-side components, one of ordinary skill in the art will appreciate that the components of the physical architecture may be located in either client or server, or in a distributed environment.

The underlying technology allows for replication to various other sites. Each new site may maintain communication with its neighbors so that in the event of a catastrophic failure, one or more servers may continue to keep the applications running, and allow the system to load-balance the application geographically as required.

Embodiments within the scope of the present invention may also include computer-readable media for carrying or having computer-executable instructions or data structures stored thereon. Such computer-readable media can be any available media that can be accessed by a general purpose or special purpose computer, including the functional design of any special purpose processor as discussed above. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, objects, components, data structures, and the functions inherent in the design of special-purpose processors, etc., that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Overview of System Operation

The present invention relates to a semi-automatic registration of pairs of planetary images collected by a passive sensor (i.e., imaging subsystem 101), and of detection of the craters in the imaged scene of the planetary surface.

First, to detect the craters, the present invention utilizes a novel MPP model for the distribution of craters in the image plane. Craters are geometrically modeled as ellipses, and the present invention provides an energy function that characterizes their expected prior behavior and their matching with the input data. Then, the crater detection result is used as an input for registration.

For this purpose, a two-step approach is taken to benefit from both crater features and area-based matching. Although area-based registration using mutual information (MI) has proven to be very accurate, it is often slow. In general, its computation time is proportional to the image size. On the other hand, although matching curvilinear features such as crater outlines can be performed in a computationally efficient manner, the resulting registration error is often larger than when MI is used.

Thus, in resolving these issues, the semi-automatic registration of the present invention uses a novel two-stage approach aimed at combining the accuracy of area-based MI methods and the efficiency of feature-based techniques. In the first step, a preliminary registration solution is determined by matching the curvilinear features extracted through crater detection. Craters are detected by using a marked point process (MPP) model optimized through one of two methods. From the perspective of feature-based registration, there is no need to extract the small craters in the scene, it is only necessary to detect some of them (especially the large ones) as precisely as possible. Hence, focus may be put especially on the detection of large craters to minimize computational burden without compromising registration accuracy.

In the second step, image registration is accomplished by matching the extracted craters through the optimization of a distance measure. Thus, a refined registration solution is computed by maximizing MI in a neighborhood of the preliminary solution. Accordingly, starting from the preliminary feature-based solution, the area-based stage can be performed in a short computation time, provided that the initial registration error is small enough.

The main differences between the two methods used to match the model and the data lie in the approaches used for the minimization of the posterior energy, and in how these approaches are integrated in the joint crater detection and registration process in a computationally efficient manner.

Methods of Crater Extraction

In one embodiment, the novel crater detection methods of the present invention utilize one of a combination of methods for feature extraction and image registration. In one embodiment, one of a region-of-interest (ROI) method or a discrete-wavelet-transform (DWT) method is used in data reduction/transformation. The reduced data is then processed to extract the contours, and the contour images are input to the crater detection module composed of an MPP energy minimization combined with one of a multiple-birth-and-death (MBD) method, or a multiple-birth-and-cut (MBC) method. Thereafter, mutual information (MI)-based image registration is performed.

A. Input of Images

In one embodiment, the imaging subsystem 101 takes images of the planetary surface, and the images are stored in the memory 104 by the command and data handling subsystem 102 using the on-board processing capabilities (i.e., a processor), in step 200. The sizes of the considered images ranged from (1581×1827) to (2950×5742).

In steps 201 and 202, the program run by the processor of the command and data handling subsystem 102, extracts an input image and a reference image from the memory 104, and the communications system 103 transfers the data (105) on these images to the Ground Segment where the data is received by the antenna 107 and forwarded by the communication system 106 to a computing device 109 (i.e., pre-processing module 110 with FPGA).

B. Pre-Processing Steps

In steps 203 and 204, the program run by the processor of the pre-processing module 110 crops the input image and reference image to speed up processing time. The cropped image and cropped reference image are stored in memory of the pre-processing Ground computing device 109.

In steps 205 and 206, the processor of the pre-processing module 110 of the Ground computing device 109, pre-processes the cropped input image and cropped reference image, respectively, by applying a noise reduction filter 110A. Thus, prior to applying the feature extraction method, any noise present can be smoothed by applying a Gaussian filtering and a median filtering operation in cascade, as identified in U.S. Pat. No. 8,355,579, the contents of which are herein incorporated by reference in its entirety.

In steps 206 and 207, the processor of the pre-processing module 109 of the Ground computing device 109, is used to compute the image gradient to extract contours from the input planetary image using an edge detector 110B, such as a Canny edge detector (see U.S. Pat. No. 8,355,579, the contents of which are herein incorporated by reference in its entirety), or another edge detector using techniques disclosed by Sobel, Prewitt, etc.

In steps 208 and 209, the resulting contoured image is provided by the computing device 109 and forwarded to computing device 111 together with the cropped input image 203 for crater extraction.

C. Crater Extraction Steps

In one embodiment, in steps 210 and 211, data reduction/transformation takes place using novel crater extraction module 115, by either one of the region-of-interest (ROI) or discrete wavelet transform (DWT) methods. The crater extraction methods are controlled by computing device 111, including controller 112 having control unit 118, arithmetic logic unit 119 and registers 120. The control unit 118 schedules the operations inter- and intra-modules; it schedules the operations of carter extraction module 115 between different regions in the ROI approach, or between different pyramid levels in case of wavelet decomposition. The control unit 118 also schedules the computation of the similarity measures in the crater-based image registration module 116 and the MI-based image registration module 123. The arithmetic logic unit 119 and the registers 120 cooperate to optimize all the operations.

The crater-based image registration module 116 is unique in its operations, and is responsible for performing image registration by optimizing a distance measure (i.e., the Hausdorff distance) between set of points; where the arithmetic logic unit 119 computes this distance for the set of points composing each crater; and the registers 120, using techniques such as caching, prefetching for memory and advanced branch predictors, improve the performances taking advantage of the principle of locality, thus, preparing fast access to the values used repeatedly and holding frequently used quantities. The same optimization techniques are adopted by those elements for the crater-based image registration module 116 and the MI-based image registration module 123 in the computation of the similarity measures.

a. ROI Method

In one embodiment, in an ROI approach, crater extraction module 115 performs unique operations by extracting a set of rectangular regions from the contour image of steps 208 and 209, and one of a multiple-birth-and-death (MBD) method or multiple-birth-and-cut (MBC) method is run on each region in parallel. The results obtained this way are then aggregated back into the reference system of the original image.

In one embodiment, FIG. 4 shows how a birth map and an ROI approach are taken with respect to a planetary image. FIG. 4(a) shows a planetary image where edge contours (i.e., extracted by a Canny edge detector in steps 206 and 207) are superimposed thereon. An unsupervised technique generally based on the identification of circular or elliptical shapes in the image by using edge information based on the generalized Hough transform (GHT) method, is used. Crater extraction module 115 performs the following steps.

In a first sub-step 210/211-a, given contour C, the GHT is used to identify candidate pixels where craters may be centered.

Figure 4A:
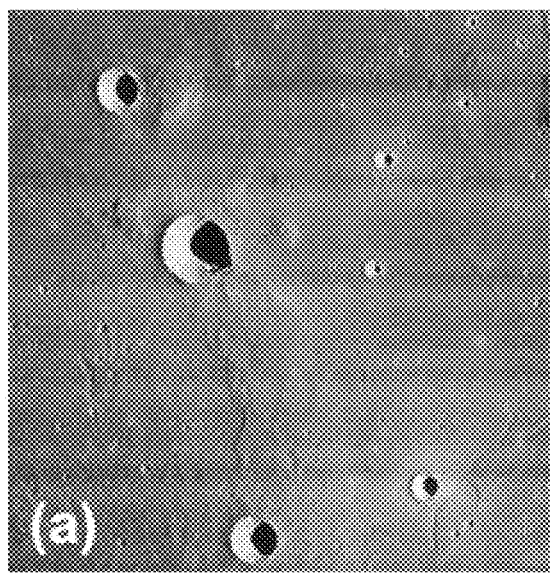
Figure 4B:
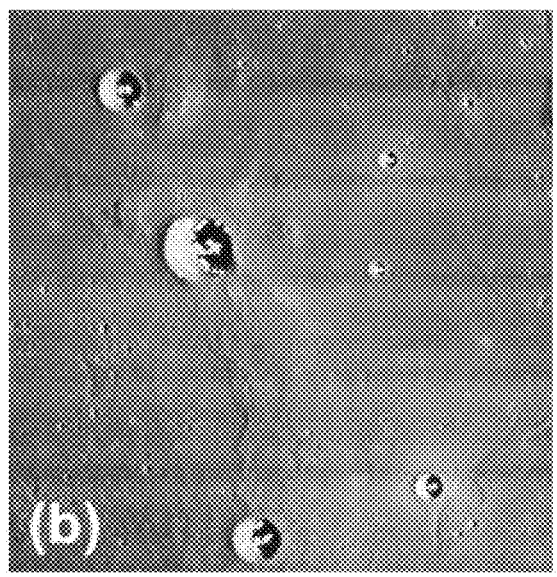

In sub-step 210/211-b, a generalized Hough accumulator is defined that aims at detecting pixels located midway between edge points in C with opposite gradient directions. FIG. 4(b) shows the results of the generalized Hough accumulator.

In sub-step 210/211-c, the connected components of the set of contour pixels C are identified using the 8-connectedness notion and are used to refine the set of candidate crater centers in the accumulator.

In sub-step 210/211-d, for each connected component, the first-order image moments (centroid) and the second-order image moments are computed.

In sub-step 210/211-e, the eigenvalues corresponding to the second-order moments are derived, and a circle with center on the centroid and radius equal to the maximum eigenvalue is drawn. The set of all such circles deriving from all connected components are used as a mask.

In sub-step 210/211-f, if a candidate crater center from GHT lies outside all such circles, it is considered due to the impact of noise on the GHT result and is discarded.

Figure 4C:
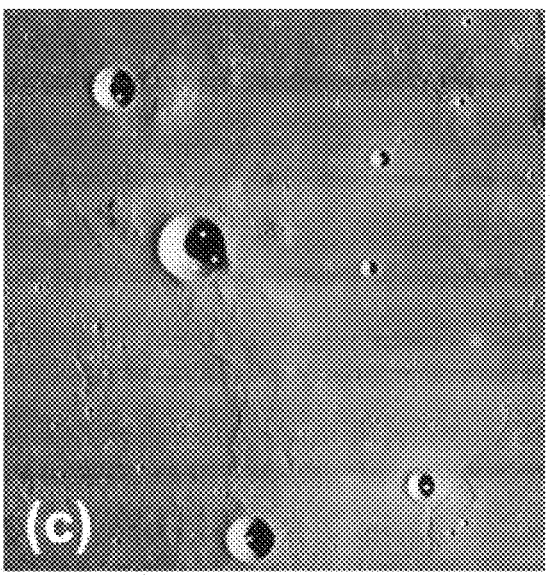
Figure 4D:
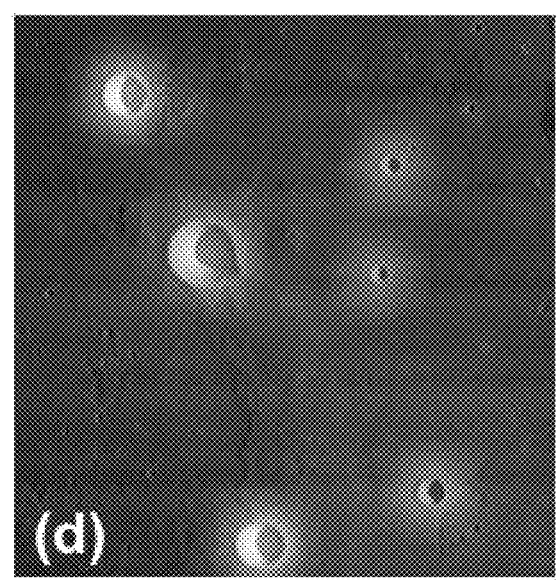

In sub-step 210/211-g, finally, the remaining centers are clustered to reduce the number of candidates and determine the locations of probable crater centers in the image. FIG. 4(c) shows the centroids obtained by clustering the accumulator centers. For this purpose, the k-means algorithm is applied to the set of candidate crater centers; the number k of desired clusters is chosen to be the number of the aforementioned-connected components.

To ensure that the birth map (s) (s∈ $\mathcal{S}$ ) is spatially smooth, in sub-step 210/211-$h$, a spatial circular Gaussian kernel is centered on each centroid, and (s) (s∈ $\mathcal{S}$ ) is defined to be a linear mixture of these Gaussian contributions. FIG. 4($d$) shows the birth map by shading the image in proportion to (s) (s∈ $\mathcal{S}$ ). The standard deviation σ of the Gaussian kernel is set in proportion to the image size.

Desired properties for the ROIs include: 1) each ROI contains contours, and vice versa all (or almost all) contour pixels are contained in some ROI; 2) craters are not split among distinct ROIs; and 3) the ROIs have little or zero spatial overlap. These requirements are met by defining the ROIs according to the birth map.

In sub-step 210/211-$i$, this means operatively, that (s) is thresholded with a threshold r and the resulting set of pixels $\{s \in \mathcal{S} : (s) > \tau\}$ is split into its connected image component.

Then, in sub-step 210/211-$j$, for each such component $\mathcal{A}$ ( $\mathcal{A} \subset \mathcal{S}$ ), the corresponding spatial centroid O$\mathcal{A}$ (first-order image moments) and the second-order image moments with the related eigenvalues are computed. The largest such eigenvalue λ$\mathcal{A}$ geometrically represents the major semi-axis of a spatial ellipse centered on O$\mathcal{A}$ that approximates $\mathcal{A}$ .

In one embodiment, in sub-step 210/211-$k$, an ROI is defined as the square centered on O$\mathcal{A}$ with side equal to (2λ$\mathcal{A}$ +$a_{max}$), where the upper bound $a_{max}$ on the ellipse axis is used as a margin. FIG. 4($e$) shows the ROIs in red boxes, as does FIG. 4($f$) for another planetary image taken by an HRSC camera.

The accuracy of the identification of candidate crater centers and of the resulting birth map is not critical. The birth map has no impact on the convergence of the MBD or MBC techniques to a global energy minimum but only affects the speed of convergence by favoring birth in relevant locations, provided that σ is large enough so that (s) is non-negligible on every pixel s∈ $\mathcal{S}$ . Similarly, the accuracy in the identification of the ROIs around relevant craters does not influence the precision with which craters are detected, provided that the contour pixels are all included in the ROIs.

b. Discrete Wavelet Transform Method

In one embodiment, in sub-step 210/211-l, an alternate, discrete wavelet transform (DWT) method is used, where starting from a planetary image, a multiscale pyramidal decomposition made of images of progressively smaller size and coarser resolution is obtained.

More specifically, in one embodiment, a decimated 2-dimensional (2-D) discrete wavelet transform (DWT) is applied to the input image, where four levels of decomposition are computed by keeping at each step only the low-pass transformed image. In other words, DWT keeps the outputs of the corresponding low-pass filters and discards the high-pass components.

Note that what follows is an iterative process of applying the crater detection method and registration, which is performed from steps 210 and 214, 216, 218, and 220/222, for the input, as well as steps 211 and 215, 217, 219, and 220/222, for the reference, so that the process is repeated, until the approximated result is obtained in steps 221 and 223. In other words, the present invention carries out an iteration on the pyramid level, by performing wavelet decomposition (steps 210, 211), extraction of craters on that level (steps 216, 217), registration on that level (steps 220, 222), to achieve a current approximated result (both craters and transformation vector) which is saved in memory 113 and used as a starting point to perform the next iteration. The details with respect to each of these steps is provided below.

The crater detection method is applied recursively from the coarsest-level decomposed image going back until the original image. At each step, all the regions where ellipses have been found at the previous (coarser) levels are removed from the search space, by erasing the corresponding edge contours.

Then, in sub-step 210/211-$m$, more particularly, in the multiscale formulation of the DWT method, denoting L as the number of decomposition levels, DWT generates a pair $\{R^l\}_{l=0}^{L}$ and $\{I^l\}_{l=0}^{L}$ of L-level multiscale pyramids by recursively applying the corresponding low-pass filters to the reference and input images. Here, $R^0=R$ and $I^0=I$ (finest scale), while $R^L$ and $I^L$ correspond to the coarsest scale.

First, crater detection through MBC and feature-based registration are performed at the $L^{th}$ scale. Let $\tilde{p}^L=(t_x^L, t_y^L, \theta^L, k^L)$ be the resulting transformation vector. Then, to proceed down the pyramid, each crater found at the $L^{th}$ scale is projected to the $(L-1)^{th}$ scale by multiplying each axis by two and resampling its center. Analogously, $\tilde{p}^L$ is also projected one scale down as $\tilde{p}_\downarrow^L=(2t_x^L, 2t_y^L, \theta^L, k^L)$ to acknowledge that the resolution of the $(L-1)^{th}$ scale is twice as fine as that of the Lth scale.

Hence, MBC and feature-based registration are applied at the $(L-1)^{th}$ scale resulting in a new transformation vector $\tilde{p}^{L-1}$. In this case, the transformation vector is searched for in a neighborhood of the solution $\tilde{p}_\downarrow^L$ coming from the coarser scale. The procedure is iterated along the pyramid until the $0^{th}$ level (i.e., the original scale) is reached and a corresponding transformation vector $\tilde{p}^0$ is computed; this solution is the output of the feature-based registration step (i.e., $\tilde{p}=\tilde{p}^0$).

Incorporating this multiscale decomposition into the framework of the present invention, allows crater-detection and feature-based registration results to be preliminarily determined on the coarsest scale and then progressively refined along the finer scales. This accomplishes an improvement in the underlying computing device 111 operation by achieving substantial reduction in computation time without sacrificing detection accuracy.

c. Crater Detection Methods

In one embodiment, either the ROI or the DWT methods are used to reduce the amount of data to be processed by the crater detection method implemented by novel crater extraction module 115. The former case reduces the data and passes the result to the crater detection step, which produces a crater map (an image containing the detected craters) (steps 218-219) to be used in the first-step registration.

Conversely, the latter case reduces the data at multiple scales and perform the aforementioned process (crater detection and registration) iteratively at each level of decomposition by refining the partial results. Thereafter, to achieve crater detection in planetary imagery, an unsupervised approach based on a marked point process (MPP) is used.

MPPs represent a powerful family of stochastic geometry models for the spatial distribution of parameterized objects or structures in the image plane. They have been found effective in various applications to Earth observation (EO), and the novel MPP method of the present invention is used for crater detection in planetary data.

Operatively, in one embodiment, crater detection is formalized as the minimization of a suitable energy function on the space of all admissible arrangements of craters in the scene. The energy encodes the desired prior behavior of the crater configuration and its fitness with the input planetary data. The minimization task is a challenging optimization problem for which advanced stochastic algorithms have been developed. Methods based on reversible jump Markov chain Monte Carlo (RJMCMC) samplers and simulated annealing were proven successful to get the maximum a-posteriori (MAP) estimator of the object distribution in the image. They incorporate appropriate "kernels" that formalize local and global perturbations in the configuration of objects but often involve long computation times.

Within the general framework for crater detection and planetary image registration of the present invention, two specific algorithms and methods were developed. In one embodiment, a method based on multiple birth-and-death (MBD) dynamics was also coupled with simulated annealing to perform multiple perturbations jointly and favor computational efficiency. In another embodiment, a semi-deterministic multiple birth-and-cut (MBC) method, which combines a random birth process and a deterministic binary classifier based on graph cuts without involving any annealing schedule, was also developed. Both methods share the same MPP energy, and differ in the energy minimization algorithms, and in the formulations adopted to favor computational efficiency to improve the working of the underlying computing device 111. In particular, birth-and-death processes, graph cuts, decimated wavelet transforms, and region-of-interest (ROI) analysis, are incorporated in various combinations, in the two methods, which uniquely optimize crater extraction and characterization.

Once the crater features have been extracted, feature-based and area-based registrations are performed by optimizing functionals that measure the fitness between two images to register. These functionals are based on metric-space (Hausdorff distance), and information-theoretic (mutual information (MI)) measures. Genetic and generalized pattern search methods are involved to address the related numerical minimization tasks.

c1. MPP Method

In one embodiment, the distribution of craters on the planetary surface are modeled using novel crater extraction module 115, by a realization of an MPP, X. An MPP is an abstract random variable whose realizations are configurations of objects, each one being described by a marked point. Similar to Markovian modeling, the maximum-a-posteriori (MAP) criterion is expressed, under the MPP assumption, to the minimization of a suitable energy function. The energy has to be designed to take into account the interactions between the geometric objects and the way they fit the image.

More specifically, a point process $\Omega$, defined over a compact subset K of $\mathbb{R}^2$, is a stochastic process whose realizations are finite sets $\omega_1, \ldots, \omega_n$ of points in K, where $\omega_i$ indicates the vector of the coordinates of the $i^{th}$ point ($\omega_i \in K$; i=1, 2, ..., n). In the case of a marked point process (MPP), the points of each realization are further enriched with the association of a set of parameters, called marks. Within an image analysis framework, these additional parameters can be used to characterize geometric properties of an object attached to the point. This implies that each realization of an MPP represents a model for the spatial distribution of an arbitrary finite number of objects in the image plane.

For example, to represent the distribution of disksin the image it is enough to add the radius mark to each point. By adding two more parameters, one could represent a distribution of ellipses (the three parameters are the two axes and an orientation angle). Hence, any realization of a marked point process D is a finite set of points in D=K×M, where K has the same meaning as before and M is the set in which the marks take values ($M \subset \mathbb{R}^{q-2}$, q≥3, $D \subset \mathbb{R}^q$).

Thus, in each of steps 214 and 215 implemented by crater extraction module 115, the following sub-steps 214/215-a to 214/215-d, are performed to arrive at a contoured image. The set of craters in the scene are modeled as a distribution of ellipses in the image, modeled as an MPPX.

In step 214/215-a, let $\mathcal{S}$ be the pixel lattice ($\mathcal{S} \subset \mathbb{Z}^2$), $\mathcal{C}$ be the set of extracted contour pixels ($\mathcal{C} \subset \mathcal{S}$), and K be the smallest rectangle enclosing the pixel lattice $\mathcal{S}$ ($\mathcal{S} \subset K \subset \mathbb{R}^2$).

Figure 3:
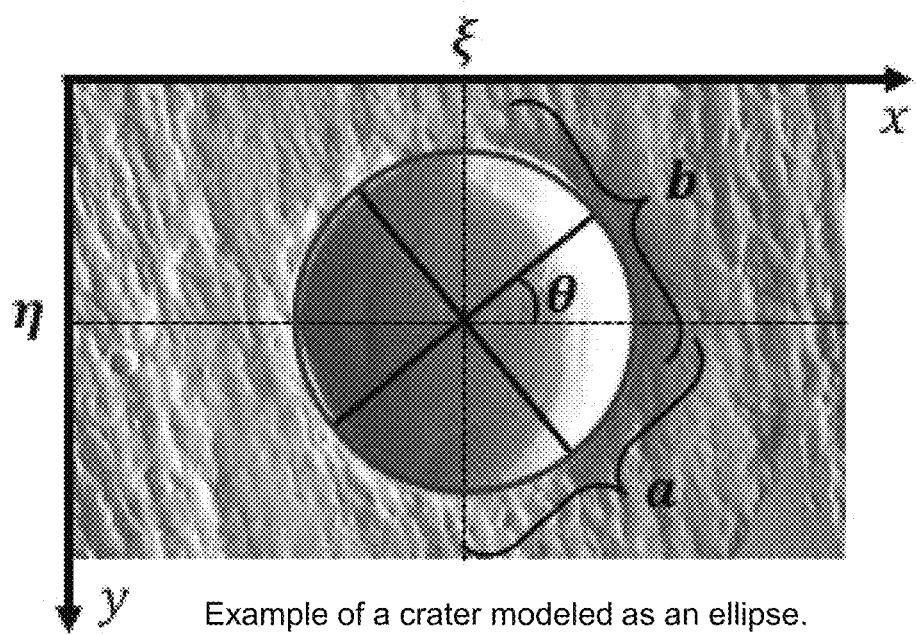
FIG. 3 shows an example of a crater modeled as an ellipse, according to one embodiment consistent with the present invention.

In step 214/215-b, each crater 300 (see FIG. 3) is geometrically represented as an ellipse and parameterized by a 5-tuple $\omega=(\xi, \eta, a, b, \phi)$, where $C=(\xi, \eta)$ represents the center of the ellipse (i.e., one point belonging to the realization of the point process), and marks a, b, and $\phi$, represent the major axis, the minor axis, and the orientation angle, respectively.

In step 214/215-c, the 5-tuple $\omega$ takes values in D=K×[$a_{min}$, $a_{max}$]×[$b_{min}$, $b_{max}$]×[0, π], where [$a_{min}$, $a_{max}$] and [$b_{min}$, $b_{max}$] are the ranges of the major and the minor axes, respectively, and [0, π] is the interval of the possible orientations.

In step 214/215-d, given a second ellipse is parameterized by the 5-tuple $\omega' \in D$, $\omega \sim \omega'$ indicates that the two ellipses spatially overlap and the percentage of their spatial intersection over their total area is larger than a threshold γ. Each realization of the MPP $\Omega$ is a finite set $\omega_1, \ldots, \omega_n$ of n such 5-tuples $\omega i=(\xi_i, \eta_i, a_i, b_i, \theta_i)$, each representing an ellipse ($\omega_i \in D$; i=1, 2, ..., n).

Hence, ($\xi_i, \eta_i$) is a point in the realization of the corresponding point process, while $a_i$, $b_i$, and $\phi_i$ are the marks. Thus, the MAP criterion is formulated as the minimization of a posterior energy function $U(\Omega | \mathcal{C})$ on the space of the possible realizations of $\Omega$, to find the arrangement of ellipses that best fits the edge map $\mathcal{C}$.

c2. Energy Function

In one embodiment, in steps 214 and 215, the energy function is ascertained from the modeling of the ellipses from the contour map extracted with the edge detection method. Note that in the design of the energy function, the energy function's minimization is with respect to not only the locations ($\xi_i, \eta_i$) and marks ($a_i, b_i, \theta_i$) of the ellipses (i=1, 2, ..., n) but also their number n. Hence, the number of detected craters is determined automatically as well.

In one embodiment, consistent with a Bayesian approach, the energy of the MPP is made up of a likelihood term, which describes how each individual ellipse fits the contours, and a prior term, which characterizes the interactions among pairs of ellipses (each formalized as a 5-tuple), i.e.:

$$U(\Omega | \mathcal{C}) = \sum_{i=1}^{n} U_L(\mathcal{C} | \omega_i) + \sum_{\omega_i \sim \omega_j} U_P(\omega_i, \omega_j),$$

where $U_L(\mathcal{C} | \omega_i)$ and $U_P(\omega_i, \omega_j)$ are unary and pairwise energy contributions (i, j=1, 2, ..., n).

In one embodiment, the prior term characterizes the general aspect of the desired solution. Overlapping craters are unlikely, hence, a strong repulsion term is introduced whenever two ellipses have non-empty intersection.

Thus, $U_P(\omega, \omega')=+\infty$ if $\omega \sim \omega'$ and $U_P(\omega, \omega')=0$ otherwise ($\omega, \omega' \in D$). This choice has been found effective in previous MPP models for Earth orbit (EO) and favors the applicability of efficient energy minimization methods (e.g., a multiple-birth-and-cut (MBC) method).

In one embodiment, the unary energy contribution of the energy function of the present invention is the sum of two terms, the first ([C]) measuring the spatial correlation between each ellipse and the extracted edges, and the second ([D]) taking into account their mutual distance ($\omega \in D$) (where |A| is the cardinality (i.e., the number of elements) of a finite set A).

$$U_L(\mathcal{C}|\omega) = \alpha_1 \underbrace{\left(1 - \frac{|\partial\omega \cap \mathcal{C}|}{|\tilde{\partial}\omega \cap \mathcal{C}|}\right)}_{[C]} + \alpha_2 \cdot \underbrace{\frac{d_H(\partial\omega, \mathcal{C})}{a}}_{[D]},$$

where $\mathcal{S}$, $\tilde{\partial}\omega \subset \mathcal{S}$), $d_H(\bullet)$ indicates the Hausdorff distance, a is the major axis of $\omega$, and $\alpha_1$ and $\alpha_2$ are positive weight coefficients that determine the relative tradeoff between terms [C] and [D]. The annulus $\tilde{\partial}\omega$ is centered around $\omega$ and delimited by two more ellipses, inside and outside $\omega$, whose distances to $\omega$ are directly proportional to the size of $\omega$.

In the present methods, term [C] measures the similarity between the ellipse $\omega$ and the contours $\mathcal{C}$ by computing a correlation coefficient between the extracted edges and the ellipse model. It is written in terms of the set of pixels $\partial\omega$ to compare the 5-tuple $\omega$ with the contours on the pixel grid. The method of the present invention was found more effective for the present application to crater detection than previous likelihood energy terms used in MPPs of ellipses for EO applications. As compared to previous correlation measures, the denominator does not sum up to the whole set of contour pixels, but it is restricted to the subset defined by the annulus. This choice is to favor that smaller and larger craters equally contribute to the total posterior energy of the entire realization. The (1−•) formulation is used so that minimizing energy favors maximizing correlation.

In the present method, term [D] measures the spatial distance between an ellipse W and the contours $\mathcal{C}$. A novel energy contribution is introduced here based on the Hausdorff distance. Informally, two sets are close in the Hausdorff distance if every point of each set is close to some point of the other set. More precisely, the Hausdorff distance is the greatest of all the distances from a point in one set, to the closest point of the other set.

If Z and W are non-empty finite subsets of a metric space endowed with the metric $d(\bullet)$, then the directed Hausdorff distance from Z to W is:

$$d_{DH}(Z, W) = \max_{z \in Z} \min_{w \in W} d(z, w),$$

where, if Z and W were infinite sets, the infimum and supremum (inf/sup) operators would be used instead of the min/max operators—a situation that does not occur in the present application to sets of pixels but that is relevant within the general definition of Hausdorff distance in a generic metric space; and where the (undirected) Hausdorff distance between Z and W is:

$$d_H(Z,W) = \max\{d_{DH}(Z,W); d_{DH}(W,Z)\}.$$

Figure 5:
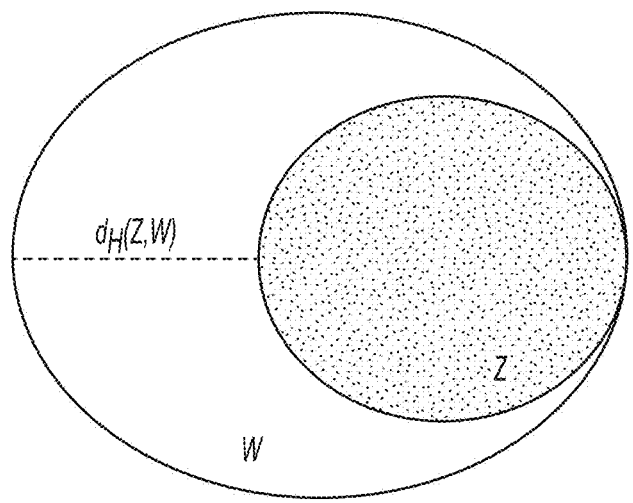
FIG. 5 shows an example of the Hausdorff distance $d_H$ between two curves Z and W, in the plane. Here (Z, W)=0, whereas (Z, W)>0.

The distance is appropriate to evaluate the fit between two curves in the image plane. For example, if Z and W are the two intersecting curves in FIG. 5, then their classical set distance $$d(Z, W) = \min_{z \in Z, w \in W} d(z, w)$$

vanishes (d(Z, W)=0), whereas $d_H(Z, W)$ is nonzero, and emphasizes the mismatch between Z and W: a desired property for crater detection.

In the present invention, the Hausdorff distance is evaluated between the sets of pixels in the edge map $\mathcal{C}$ and in the border $\partial\omega$ of ellipse $\omega$, using the Euclidean metric for (•). The major axis a is used as a normalization coefficient to avoid imbalance when terms coming from ellipses of very different sizes are summed together to contribute to the total energy.

Thus, in one embodiment, for the minimization of the energy function, a Markov chain algorithm coupled with a simulated annealing (SA) scheme, is used. The minimization is carried out with respect to the locations, the marks, and the number of ellipses.

c3. Multiple-Birth-and-Death Method

After the minimization of the energy function, the crater extraction module 115 implements a multiple-birth-and-death (MBD) method, where the MPP X is sampled by using an MBD method—one of the two methods that are used for crater detection.

The MBD method allows building a Markov chain $X_k$ (k=0, 1, . . . ) in the space of the possible configurations, which, in the ideal case, ergodically converges to the optimum distribution. The MBD method, after an initialization step, iterates through birth-and-death steps embedded in a probabilistic framework.

i. Initialization

The initialization step generates the birth map—a spatial map that describes on which pixels it is more probable to find craters, and that is useful to speed up convergence. The birth map is generated by finding possible ellipse centers using a generalized Hough accumulator. The centers are then used as seeds points to be spread through Gaussian filtering.

In one embodiment, the MBD initialization step is summarized as follows.

For the formulation of MBD method for crater detection: $\Omega$ is the current realization of the MPP; $\mathcal{C}$ is the contour map; $U_L$ is the likelihood energy; $[a_{min}, a_{max}]$, $[b_{min}, b_{max}]$, and $[0, \pi]$ are the ranges on the marks of the ellipses of the proposed MPP; $\{B(s)\}_{s \in \mathcal{S}}$ is the birth map; $\beta$ and $\delta$ are the parameters of MBD; $\kappa$ is the reason of their geometric annealing schedule; $\beta^0$ and $\delta^0$ are their initial values; and n* is the maximum number of ellipses that can be born on each iteration. Input: $\mathcal{C}$, $U_L$, $\{B(s)\}_{s \in \mathcal{S}}$, $\beta^0$, $\delta^0$, $\kappa$, n*. Initialize: $\beta=\beta^0$, $\delta=\delta^0$, $\Omega=\emptyset$.

In one embodiment, with respect to the simulated annealing (SA), there are two parameters to be set in the MBD method. The first is an inverse temperature $\beta$ and the second is a discretization step $\delta$. These parameters are initialized to rather large values and evolve through the iterations according to geometric annealing schedules of reason $\kappa$. Then, on each iteration, a birth and a death step are performed.

ii. Birth Step

For each iteration in the birth step, a realization $\Omega^*$ made of up to n* ellipses is sampled, whose centers are spatially distributed on the pixel lattice with probability $P_{birth}(s) = \delta \cdot B(s)$, $(s \in \mathcal{S})$ and whose major axis, minor axis, and orientation are sampled independently and with uniform distributions from $[a_{min}, a_{max}]$, $[b_{min}, b_{max}]$, and $[0, \pi]$, respectively. Update $\Omega \leftarrow \Omega \cup \Omega^*$.

Thus, in the birth step, new ellipses are added to the current configuration according to the birth map and the current value of δ. Consistently with the simulated annealing (SA) strategy, δ decreases from large values on the first iterations, which make it possible to give birth to many new ellipses, to smaller values on later iterations. In the adopted formulation of MBD, the number of ellipses that can be born on each iteration is limited by an upper bound n*, which is predefined according to the size of the image and the order of magnitude of the expected number of craters per unit area (which is known apriori from planetary science studies). This formulation allows limiting the computation time to prevent the birth step to generate ellipses almost everywhere in the image because of a large discretization step δ.

ii. Death Step

For each iteration in the death step, the ellipses in Ω are sorted in order of decreasing likelihood energy $U_L(\mathcal{C}|\omega)$, (ω∈Ω). Ω is scanned sequentially in the resulting order. For each ellipse ω∈Ω, if ω overlaps with some other ellipse in Ω, then remove ω from Ω. Otherwise if ω a does not overlap with any other ellipse in Ω, then remove ω from Ψ with probability equal to:

$$P_{death}(\omega) = \frac{\delta \exp[\beta U_L(\mathcal{C}|\omega)]}{1 + \delta \exp[\beta U_L(\mathcal{C}|\omega)]}$$

The goal of the death step is to reduce ("kill") the number of ellipses in the configuration returned by the birth step according to their energy contributions. The pairwise energy $U_P$ forbids overlapping ellipses and gives no penalty otherwise. Therefore, on one hand, if two ellipses in the current configuration overlap, then one of them will deterministically be removed. In the adopted formulation, the ellipse with the larger likelihood energy $U_L$ is deleted. On the other hand, if an ellipse w does not overlap with any other ellipse in the current configuration, then it is killed with a probability that depends on $U_L(\mathcal{C}|\omega)$, β, and δ (see above with respect to the birth step).

As the iteration progresses, β increases and δ decreases, which lets more ellipses die in the first iterations, while the configuration is intuitively frozen later on. The method is stopped if, at the same iteration, all newly born ellipses are also killed, and if the total number of such ellipses is below a threshold (here, equal to 5% of n*). Thus, the survived configuration is analyzed and among the overlapping ellipses, identified by a high prior energy term, only those with lower death probability are kept in order to grant the desired configuration.

iii. Convergence Test

As noted above, in one embodiment, the method stops the sampling process when the ellipses that are killed in the $i^{th}$ iteration are exactly the same that were born in the same iteration. In other words, if all the ellipses that have been generated in the birth step are also removed in the death step and if the total number of such ellipses is below a threshold (here, equal to 5% of n*), then the method stops. Otherwise, β ⟵ β/κ and δ ⟵ κδ is updated and proceed to the birth step. Output: realization Ω.

iv. Region-of-Interest (ROI) Approach to MBD

In one embodiment, since the MBD is computationally heavy, and the burden increases with image size, as noted above, the ROI method can be used with the MBD method. In one embodiment, a set of rectangular regions are extracted from the image and MBD is run in parallel on each region. The results obtained are aggregated back into the reference system of the original image.

c4. Multiple-Birth-and-Cut Method

Common (e.g., direct or gradient-based) minimizers are often not effective for the minimization of the energy of an MPP because the minimization problem is challenging with many local minima and a huge search space. On the contrary, the Multiple-Birth-and-Cut (MBC) method, which is the second method adopted for the minimization of the energy function of the crater detection framework as implemented by crater detection module 115, iteratively combines a birth process with the application of a graph cut method to a case-specific graph as a death process. The MBC is an efficient tool for the minimization of MPP energies and is an effective alternative to simulated annealing (SA)-type approaches.

Formulation of MBC for crater detection: Ω is the current realization of the MPP; D is the domain where each marked point takes values; $\mathcal{C}$ is the contour map; $U_L$ is the likelihood energy; and n* is the maximum number of ellipses that can be born on each iteration. Input: $\mathcal{C}$, $U_L$, n*.

i. Initialization

In the initialization step, MBC is initialized with a random configuration of up to n* ellipses drawn independently with uniform distribution and constrained to be non-overlapping. In other words, the number of ellipses to be added in each iteration and each iteration count and generation of the initial configuration of ellipses is determined. The number of ellipses only impacts convergence speed and not detection accuracy.

The MBC formulation is summarized below.

Initialize: sample a realization Ω composed of up to n* non-overlapping ellipses drawn independently and with uniform distribution from D.

ii. Birth Step

In the birth step, a generation of a new configuration of non-overlapping ellipses in the scene is determined by sampling new ellipses according to a prior probability distribution. In other words, similar to MBD, each iteration includes a birth step in which up to n* new ellipses are sampled, but unlike MBD, these new ellipses are not allowed to overlap and are drawn with uniform distribution.

For each iteration: Sample a realization Ω* composed of up to n* non-overlapping ellipses drawn independently and with uniform distribution from D.

iii. Cut Step

Rather than using a probabilistic death step, each iteration of MBC makes use of graph cuts to discriminate the ellipses to remove and those to preserve. Graph cut methods are based on the min-flow/max-cut theorem and have been found very efficient for the minimization of the energies of Markov random fields and conditional random fields.

In each iteration of MBC, a case-specific weighted undirected graph is constructed on the set of all current ellipses, either coming from the previous iteration or resulting from the birth step. Then, the "kill or let live" decision about these ellipses is cast as a binary labeling problem, which, in turn, is formulated as the minimization of a case-specific energy function E(•) and addressed using graph cuts. The technique of the present invention ensures that the global minimum of the energy function E(•) is reached.

A condition for the applicability of MBC is that the likelihood energy $U_L$ takes values in the [0, 1] interval. In the case of the MPP model, it is straightforward to satisfy this condition by suitably setting the weights $\alpha_1$ and $\alpha_2$. MBC requires the tuning of a single parameter, n*, which has been demonstrated to influence convergence speed but not the accuracy.

In one embodiment, a graph is constructed whose nodes are the ellipses in $\omega \cup \Omega^*$ and whose edges connect overlapping ellipses(i.e., $\omega \sim \omega'$ for $\omega \in \Omega$ and $\omega' \in \Omega^*$ or vice versa). A binary label $f_\omega \in \{0,1\}$ is assigned to every ellipse $\Omega \in \Omega \cup \Omega^*$. Graph cuts are used to determine the binary labeling $F = \{f_\omega\}_{\omega \in \Omega \cup \Omega^*}$ that minimizes the following energy:

$$E(\mathcal{F}) = \sum_{\omega \in \Omega}[c_\omega(1 - f_\omega) + (1 - c_\omega)f_\omega] + \sum_{\omega \in \Omega^*}[c_\omega f_\omega + (1 - c_\omega)(1 - f_\omega)] + \sum_{\omega \sim \omega'}V(f_\omega, f_{\omega'}),$$

where $c_\omega = U_L(\mathcal{C}|\omega)$, $V(0,1) = +\infty$, and $V(0,0) = V(1,1) = V(1,0) = 0$. If $\omega \in \Omega$ and $f_\omega = 0$, then remove $\omega$ from $\Omega$. If $\omega \in \Omega^*$ and $f_\omega = 1$, then remove $\omega$ from $\Omega^*$. Update $\Omega \leftarrow \Omega \cup \Omega^*$.

iv. Convergence Test

As noted above with respect to sub-step 210/211-1, the wavelet transform (DWT) multiscale pyramidal decomposition made of images of progressively smaller size and coarser resolution is performed, again until the method is stopped when the configuration of ellipses remains stable for a large number of iterations. The output then achieves: realization D. Because of this choice, there generally is a trade-off between accuracy and computation time.

Thus, the present invention integrates the novel DWT and MBC approach to MPP energy minimization, to benefit from multiscale information for both crater detection and registration purposes to improve the underlying computing device's operation with respect to image registration.

d. Planetary Two-Step Image Registration Using the Extracted Craters

As a result of the above crater detection steps performed by the crater extraction module 115, the resulting craters are achieved in steps 216 and 217 and are used to create a crater map in steps 218 and 219.

Thereafter, image registration is performed in two steps, using novel crater-based image registration module 116, where: the first matches the extracted features of both images, while the second maximized the mutual information in a small neighborhood of the transformation obtained by the first step.

d1. First Registration Step

With respect to the two images to be registered, the novel crater-based image registration module 116 of the present invention, can match the craters extracted from the reference image with the edge contours extracted from the input image, or match the craters extracted from both reference and input images. In the former case, the minimization is performed as follows.

Let $R(x, y)$ and $I(x, y)$ be two planetary images to be registered, where x and y indicate the spatial coordinates and R and I take on nonzero values in some bounded subset of $\mathbb{R}^2$ (i.e., R and I are compactly supported functions). It is convenient to model the two images as defined on a continuous-variable domain of $\mathbb{R}^2$, although data are obviously recorded only on the corresponding pixel lattices. The two images represent the same planetary surface including craters. However, they are aligned differently, as they may have been acquired at different times, or from different viewpoints. R is used as the reference image and I as the input image to be transformed. The transformation $T_p: \mathbb{R}^2 \to \mathbb{R}^2$ from the spatial coordinate system of the reference to that of the input image is chosen to be rotation-scale-translation (RST), i.e. $((x, y) \in \mathbb{R}^2)$:

$$T_p(x, y) = \begin{bmatrix} k\cos\theta & k\sin\theta & t_x \\ -k\sin\theta & k\cos\theta & t_y \end{bmatrix} \cdot \begin{bmatrix} x \\ y \\ 1 \end{bmatrix},$$

where $t_x$ and $t_y$ determine translations in the x and y directions, respectively ($t_x, t_y \in \mathbb{R}$), $\theta$ is the rotation angle ($0 \leq \theta < 2\pi$), k is the scaling factor (k>0), and $p=(t_x, t_y, \theta, k)$ is the vector collecting all transformation parameters; and p takes values in the set $P = \mathbb{R}^2 \times [0, 2\pi) \times (0, +\infty)$. To register the two images, the value of $p \in P$ should be such that the transformed input image $I(T_p(x, y))$ (up to resampling on the corresponding pixel lattice) best matches the reference image $R(x, y)$ over its support.

Accordingly, a preliminary solution $\tilde{p}$ is searched for using the detected craters. A functional $\mathcal{J}(p)$ ($p \in P$) that measures the misalignment between the curvilinear features in R and those in $I(T_p(\bullet))$ is defined, and $\tilde{p}$ is determined by minimizing $\mathcal{J}(\bullet)$.

i. Crater-to-Crater Registration

In one embodiment, in crater-to-crater registration (step 220) performed by the crater-based image registration module 116, mapping of the reference and input image to be registered, is performed by mapping, which is modeled as a rotational-scale-translation (RST). The crater detection method is used in the registration process as the feature extraction method: craters are extracted from the reference and input images and, in step 220, the optimal RST transformation is computed through the optimization, with respect to the Hausdorff distance between the outlines of the craters in the two images (step 221).

In this case, a realization $\omega^I = \{\omega_1^I, \omega_2^I, \ldots, \omega_m^I\}$ of the MPP of the present invention is also determined for the input image, by minimizing the energy $U(\bullet | \mathcal{C}^I)$ with contours $\mathcal{C}^I$, and the detected configurations of ellipses $\Omega^I$ and $\Omega^R$ are matched. The likelihood energy evaluates the fit between an MPP realization and a contour map and not between two MPP realizations. In principle, a way to measure the fit between such realizations could be to compute directly some distance between the 5-tuples describing their ellipses.

However, the expected number of craters in each image is not large, which would make this distance sensitive to small errors in the identification of the locations and shapes of the craters. Here, as a functional to guide the registration process, the MDHD from the craters detected in the reference image to those detected in the input image is used as a classical feature-matching criterion. Given two finite subsets Z and W of a metric space, the MDHD from Z to W is:

$$d_{MDH}(Z, W) = \frac{1}{|Z|} \sum_{z \in Z} \min_{w \in W} d_H(z, w).$$

Hence, for the case of crater-to-crater registration, the following functional is used ($p \in P$):

$$\mathcal{J}(p) = d_{MDH}\left[\bigcup_{i=1}^{n} \partial T_p(\omega_i^R), \bigcup_{j=1}^{m} \partial \omega_j^I\right],$$

which evaluates the MDHD from the borders of all transformed ellipses of the reference image (i.e., all transformed sets $\partial T_p(\omega_i^R)$, i=1, 2, ..., n) to the borders of all ellipses of the input image (i.e., all sets $\partial \omega_j^I$, j=1, 2, ..., m).

ii. Crater-to-Contour Registration

In this case, crater detection is performed by the crater-based image registration module 116; the craters extracted on the reference image are matched to the edges of the input image. Let $\mathcal{C}^R$ and $\mathcal{C}^I$ be the contour maps obtained by separately operating on the reference and input images, respectively, and let $\Omega^R = \{\omega_1^R, \omega_2^R, \ldots, \omega_n^R\}$ be the realization of the MPP of ellipses that is obtained by minimizing the energy $U(\bullet | \mathcal{C}^R)$ with the contours of the reference image. In the framework of the present invention, the likelihood energy represents a natural choice for a functional measuring the fitness between an MPP realization and a contour map. In particular, if a transformation $T_p$, $p=(t_x, t_y, \theta, k)$, maps the coordinate system of the reference to that of the input image, then each ellipse $\omega_i^R = (\xi_i^R, \eta_i^R, a_i^R, b_i^R, \phi_i^R)$ in the reference domain is mapped to the transformed ellipse $(T_p(\xi_i^R, \eta_i^R), ka_i^R, kb_i^R, \phi_i^R+\theta)$, which is conveniently indicated as $T_p(\omega_i^R)$, with i=1, 2, ..., n. To match the transformed realization $\{T_p(\omega_1^R), T_p(\omega_2^R), \ldots, T_p(\omega_n^R)\}$ to the contours $\mathcal{C}^I$ of the input image, the following functional is used (p∈P):

$$\mathcal{J}(p) = \sum_{i=1}^{n} U_L[\mathcal{C}^I | T_p(\omega_i^R)].$$

The solution $\tilde{p}$ is generally affected by the accuracy of the crater detection result. Hence, the registration error between R and the transformed image $(T_{\tilde{p}}(\bullet))$ also depends on the crater detection accuracy (step 223).

Note that the unconstrained minimization of the related functionals ($\mathcal{J}$ and MI) can be addressed using common numerical techniques such as genetic algorithms, simulated annealing (SA), or generalized pattern search.

d2. Second Registration Step

The first step implemented by the crater-based image registration module 116 provides a transformation result $\tilde{p}$. To improve registration performances, a further step of maximization of the mutual information (MI) between the two images is also performed by the mutual information-based image registration module 123 in a neighborhood of $\tilde{p}$, thus, finding a further RST transformation. The maximization is performed using simulated annealing (SA).

To ensure that small registration error is attained, a second RST mapping $T_p$ is considered, and the MI between the newly transformed image $I(T_p(\bullet))$ and the reference image R is maximized with respect to p in a neighborhood of $\tilde{p}$. This yields the final solution p*. The initialization of this second step through the intermediate solution $\tilde{p}$ makes it possible to restrict the search to a neighborhood of $\tilde{p}$, thus mitigating the computational workload of the area-based computation of MI.

This second step is fast, as the search space has been dramatically reduced by the previous step, and is also accurate, as registration is based on this MI measure is known to be robust and effective. The result is an image registration scheme (step 227) which improves the underlying operation of the computing device 111 by granting the speed properties of the crater-based registration with the accuracy of the MI-based technique.

In both steps, the unconstrained minimization of the related functionals (Q and MI) can be addressed using common numerical techniques such as genetic algorithms, simulated annealing (SA), or generalized pattern search.

In one embodiment, this type of method could also be used for the analysis and the registration of medical images.

Experimental Results

A. Datasets for Experiments

For the validation of the present invention, in one embodiment, images retrieved from a database of planetary images (i.e., NASA Planetary Data System (PDS)) were used. PDS is a database which ensures the long-term usability of NASA data and which is used to stimulate advanced research. In particular, the images used in this experimental validation were acquired by two planetary mission (i.e., a Mars missions and a Lunar mission: Mars Odyssey, Mars Express, and Lunar Reconnaissance Orbiter (LRO)).

In one embodiment, data from the Thermal Emission Imaging System (THEMIS), the High-Resolution Stereo Camera (HRSC), and the Lunar Reconnaissance Orbiter Camera (LROC) onboard Mars Odyssey, Mars Express, and LRO, respectively, were retrieved from the PDS database (i.e., memory 104, step 200) and used as input images.

For evaluating the performances of the developed crater detection methods, the dataset composed of 13 THEMIS and HRSC single-channel images was retrieved from the PDS database (i.e., memory 104) by processing system (i.e., system 102). As noted above, in one embodiment, THEMIS is composed of a visible imaging camera (i.e., sensor 101) acquiring data at the resolution of 18 m and an infrared camera (i.e., sensor 101) with spatial resolution of 100 m, while in one embodiment, HRSC (i.e., sensor 101) acquires images with a resolution between 10 m and 30 m. The sizes of the considered images ranges from (1581×1827) to (2950×5742).

Figure 6:
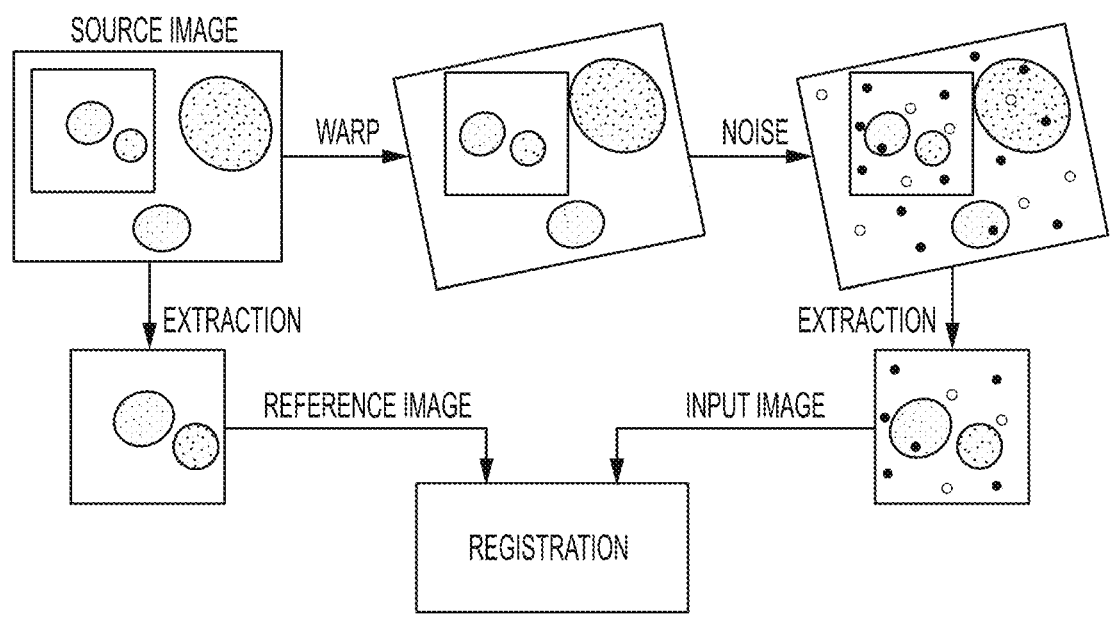
FIG. 6 is an illustration of the semi-synthetic data generation, according to one embodiment consistent with the present invention.

In order to validate the object of the present invention, both semi-synthetic and real data were used. The generation of the semi-synthetic data is illustrated in FIG. 6. Given a real THEMIS or HRSC input image (i.e., step 200), the input image was extracted (i.e., step 201), and a rectangular region was cropped (i.e., step 203) by pre-processing module 110, to be used as the reference image R (i.e., steps 202, 204).

Then, for experimental purposes, the original THEMIS or HRSC input image was geometrically warped using pre-processing module 110 (i.e., step 203) according to a pre-defined transformation vector; zero-mean Gaussian noise was added (i.e., step 205) using noise filter 110A; and the same rectangular region was cropped to become the input image I (i.e., step 203). Cropping of the image is necessary to avoid artifacts and border effects in the resulting image pair.

Then, the methods of the present invention were applied to the pair {R, I} of images, including: noise reduction (i.e., steps 205, 206) using noise filter 110A; edge detection using edge detector 110B (i.e., steps 206, 207); data reduction/transformation by region-of-interest (ROI) and discrete wavelength transfer (DWT) (i.e., steps 210, 211) using crater extraction module 115; crater detection using MPP processes using crater extraction module 115, as well as MBC or MBD methods (i.e., steps 214, 215); crater-to-crater registration or crater-to-contour registration (i.e., steps 220, 222), using the crater-based image registration module 116; and mutual information (MI)-based registration using simulated annealing (SA) (i.e., steps 224-227) using the mutual information-based registration module 123.

The resulting transformation (i.e., step 225) was obviously applied to the entire image area without any more cropping, to achieve image registration according to the two-step process described above.

To obtain a comprehensive set of images and test the registration approach of the present invention, the present methods were applied as above, with five different transformational iterations to two images from each of the two sensors (THEMIS and HRSC) to obtain a result of a set of 20 semi-synthetic image pairs. The rationale of the experiment with semi-simulated data is that, for each pair, the true RST transformation is known, a condition that allows the registration error to be quantitatively computed. Then, the present registration methods were also validated using a pair of real single-channel LROC images collected with the Narrow Angle Camera (NAC) (i.e., sensor 101) at 1.5 m resolution at different times over the same planetary (i.e., lunar) surface region. Substantial differences in the overall illumination of the two images were noted. On one hand, this second experiment allowed the registration quality to be appreciated with real data as well. On the other hand, no reference "true" transformation is available in this case. Hence, quantitative error assessment was not obtained.

B. Parameter Setting and Experimental Set-Up

With respect to the above experiments, the present invention utilized MPP modeling by the crater extraction module 115, where the parameter values of the experiment were set based on traditional MPP methods in order to obtain more certain results of the MBD and MBC approaches to image registration, and applied by trial-and-error.

With respect to the parameters of the edge detector 110B (i.e., the variance of the related Gaussian smoothing filter implemented by filter 110A and the hysteresis thresholds), the parameters were used to generate all contour maps. The parameters of the present invention were set within the experimental validation.

In the experiments, the MPP model used included the two positive parameters $\alpha_1$ and $\alpha_2$. These parameters tune the relative weight between the correlation and distance contributions to the likelihood energy. Given a contour map, $\alpha_1/\alpha_2$ was determined so that the two contributions had the same average weight. In the case of R-MBD, setting this ratio is enough. In the case of W-MBC, given the value of the ratio $\alpha_1/\alpha_2$, the values of $\alpha_1$ and $\alpha_2$ were chosen so that $U_L$ took values in the [0, 1] range. Moreover, the radius r of the annulus is directly proportional to the axes of the associated ellipse.

The ranges [$a_{min}$, $a_{max}$], [$b_{min}$, $b_{max}$] of the axes of the ellipses were set according to the expected size of the target craters as compared to the spatial resolutions of the THEMIS, HRSC, and LROC images. In particular, large craters are of higher importance for registration than small craters, so the focus was put especially on the detection of medium-to-large craters. This restriction was easily incorporated into the present framework by tuning $a_{min}$, $a_{max}$, $b_{min}$, and $b_{max}$.

Regarding R-MBD, the parameters of the method are the initial values $\beta^0$ and $\delta^0$ of the inverse temperature f and of the discretization step $\delta$, and the reason $\kappa$ of their geometric annealing schedule. They were set at $\beta^0=50$, $\delta^0=200,000$, and $\kappa=0.97$. These values were chosen according to the traditional MPP methods. Given each input image, the standard deviation a of the Gaussian filter was set to 70% of the maximum major axis of the target ellipses (i.e., $\sigma=0.7a_{max}$). The threshold $\tau$ on the birth map was determined so that each resulting ROI is not larger than 40% of the image size.

With regard to W-MBC, L=4 decomposition levels were used in the application of DWT as a tradeoff between effectively exploiting multiscale information and not degrading spatial resolution in the output result. Daubechies wavelets of order 4 were used. The threshold $\gamma$ on the percentage overlap among craters is set to 10%.

In the case of both methods, the number n* of ellipse to draw on each iteration was set to a maximum of 20 craters per image.

C. Crater Detection Results

Ground truth data were generated by analyzing each of the 13 THEMIS and HRSC images and by identifying the corresponding craters. A quantitative assessment of the results obtained by the methods of the present invention was accomplished by computing the detection percentage D, the branching factor B, and the quality percentage Q:

$$D = \frac{TP}{TP+FN}, B = \frac{FP}{TP}, Q = \frac{TP}{TP+FP+FN},$$

where TP (true positive) is the number of detected ellipses that correspond to ground truth craters; FP (false positive) is the number of detected ellipses that do not correspond to any ground truth crater; and FN (false negative) is the number of missed ground truth craters.

Table 1 quantitatively summarizes the results obtained by the R-MBD and W-MBC methods of the present invention on the data set for crater detection. The two methods of the present invention exhibited similar performances in the applications to both THEMIS and HRSC images. They obtained high values of detection and quality percentages and were able to keep the branching factor to low values. In particular, R-MBD achieved higher values of detection and quality percentage, while W-MBC required a shorter time for convergence. W-MBC obtained no false positives at all, while R-MBD yielded a small but nonzero value of branching factor.

The results of the present methods were compared to those achieved where GHT was combined with watershed segmentation. The comparison is especially notable in the case of R-MBD, because the technique is involved in the computation of the corresponding birth map. Performance measures were the same as here, and experiments were performed on two THEMIS datasets, one collected by the THEMIS TIR camera and the other by the THEMIS visible camera, and on a dataset acquired by the HiRISE (High Resolution Imaging Science Experiment) camera onboard a spacecraft (i.e., the Mars Reconnaissance Orbiter).

A summary of the performances is shown in Table 2.

TABLE 1

QUANTITATIVE PERFORMANCE OF THE R-MBD AND W-MBC METHODS WHEN APPLIED FOR CRATER DETECTION TO 13 THEMIS AND HRSC IMAGES OF A PLANETARY SURFACE

| | Data | | | | | |
|---|---|---|---|---|---|---|
| | Detection Percentage (D) | | Branching Factor (B) | | Quality Percentage (Q) | |
| | R-MBD | W-MBC | R-MBD | W-MBC | R-MBD | W-MBC |
| THEMIS | 0.91 | 0.82 | 0.10 | 0 | 0.83 | 0.82 |
| HRSC | 0.89 | 0.74 | 0.06 | 0 | 0.85 | 0.74 |
| Average on all images | 0.90 | 0.78 | 0.09 | 0 | 0.84 | 0.78 |

TABLE 2

QUANTITATIVE PERFORMANCE OF THE GHT-WATERSHED METHOD FOR CRATER DETECTION WHEN APPLIED TO 21 THEMIS AND HiRISE IMAGES

| | Data | | | | | |
|---|---|---|---|---|---|---|
| | Detection Percentage (D) | | Branching Factor (B) | | Quality Percentage (Q) | |
| MENUS | 0.91 | 0.82 | 0.10 | 0 | 0.83 | 0.82 |
| HiRISE | 0.89 | 0.74 | 0.06 | 0 | 0.85 | 0.74 |
| Average on all images | 0.90 | 0.78 | 0.09 | 0 | 0.84 | 0.78 |

The present R-MBD and W-MBC methods obtained improved crater detection performance by the underlying computing device 111 as compared to previous methods. The values of D and B point out that the present developed methods were able to reduce the negative effect of the false positives while keeping high percentages with regard to the true positives. Indeed, the accuracy values of the proposed methods show that the large differences in all three performance figures suggest a substantial improvement in accuracy of R-MBD and W-MBC as compared to the previous GHT-watershed method.

Figure 7A:
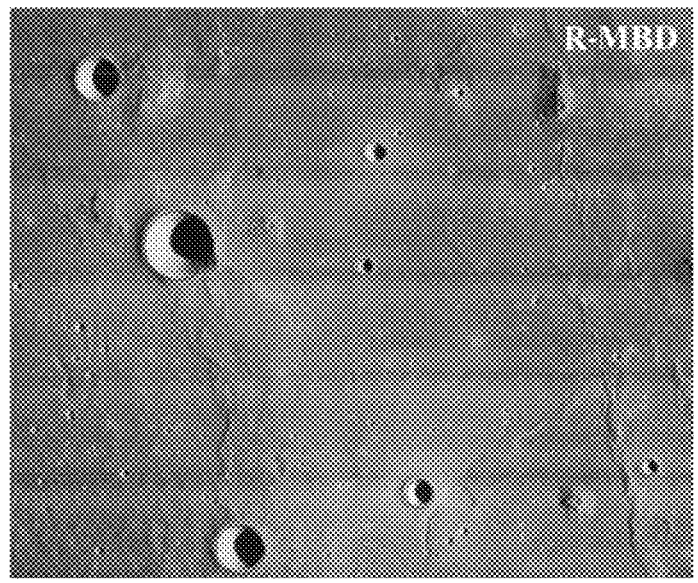
FIGS. 7(a)-(b) show experimental results obtained by applying the methods of one embodiment of the present invention to a planetary image taken by a sensor (THEMIS).
Figure 7B:
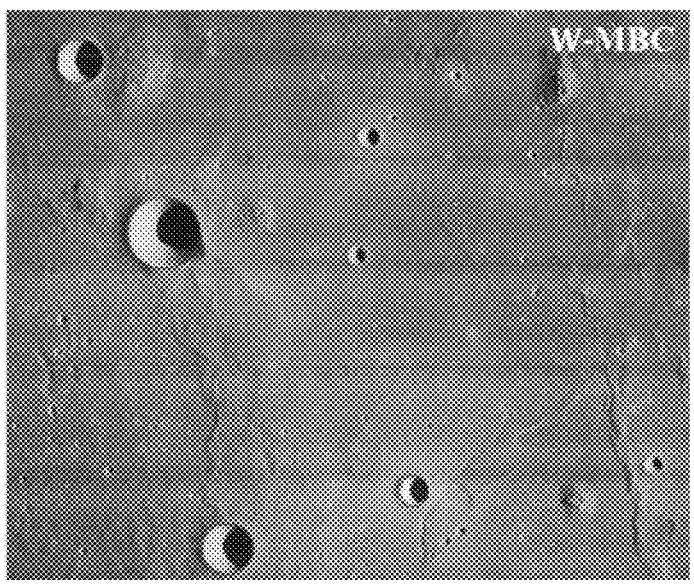

Visual examples of the results obtained by applying the methods of the present invention for the detection of craters on the Mars surface are shown in FIGS. 7(a) and 7(b). In particular, FIGS. 7(a)-(b) show experimental results obtained by applying the methods of one embodiment of the present invention to a planetary image taken by a sensor (THEMIS). FIG. 7(a) shows the results obtained by multiple-birth-and-death methods (R-MBD); and FIG. 7(b) shows the results obtained by the multiple-birth-and-cut methods (R-MBC). The detected craters are shown in black circles.

Figure 8:
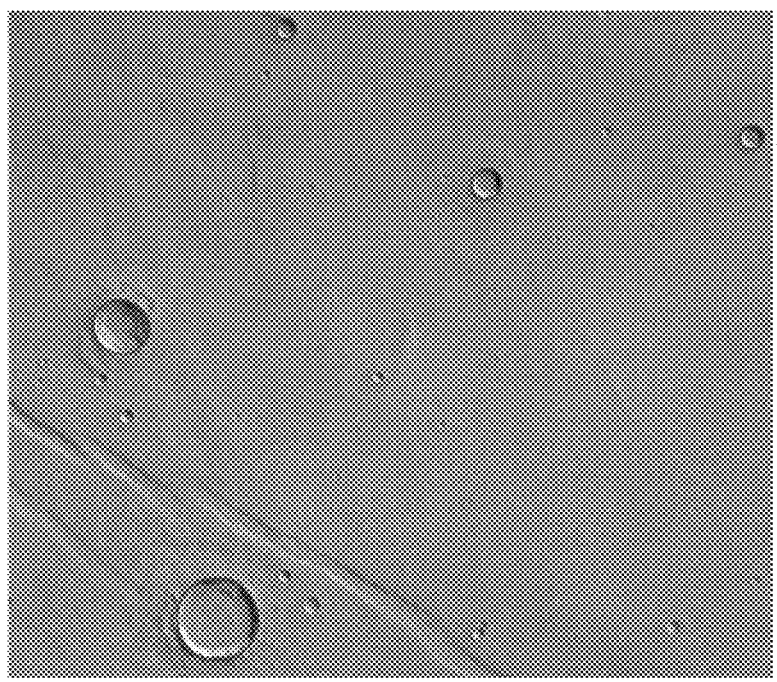
FIG. 8 shows the experimental results obtained by one embodiment of the present invention, by applying the R-MBD to a planetary image (HRSC image). The extracted craters are identified (circles).

With the present MPP-based methods, not only are the edges of the craters well detected, but also their geometrical properties are determined. An example in shown in FIG. 8 with regard to R-MBD method and similar results are provided by W-MBC method, as well. FIG. 8 shows the experimental results obtained by one embodiment of the present invention, by applying the R-MBD to a planetary image (HRSC image). The extracted craters are identified (circles).

The geometric properties extracted by the methods of the present invention in FIG. 8 included (coordinates and axes in pixel units):

Crater 1: center $(\xi, \eta)=(139, 393)$; axes $(a, b)=(35, 33)$, orientation angle $\phi=65°$;

Crater 2: center $(\xi, \eta)=(258, 756)$; axes $(a, b)=(51, 50)$, orientation angle $\phi=115°$;

Crater 3: center $(\xi, \eta)=(343, 23)$; axes $(a, b)=(13, 12)$, orientation angle $\phi=180°$;

Crater 4: center $(\xi, \eta)=(591, 215)$; axes $(a, b)=(19, 18)$, orientation angle $\phi=31°$;

Crater 5: center $(\xi, \eta)=(919, 157)$; axes $(a, b)=(15,14)$, orientation angle $\phi=106°$.

Thus, the present invention can be applied to multiple applications of these crater detection methods, which include not only image registration but also crater dating based on their morphological appearance, and crater counting, which is used for estimating the age of planetary surfaces based on the assumption that impact craters accumulate at a constant rate.

D. Semi-Synthetic Registration Results

For each semi-synthetic image pair, given the corresponding true ("ground truth") transformation vector $p_{CT}$, the registration error of the methods of the present invention can be evaluated quantitatively. As a standard way of assessing registration accuracy, the root-mean-square registration error (RMSE) in pixels between the true and the estimated transformations is used.

TABLE 3

QUANTITATIVE PERFORMANCE ASSESSMENT OF W-MBC AND R-MBD WHEN APPLIED TO THE REGISTRATION OF THE SEMI-SYNTHETIC DATASETS, AS MEASURED IN TERMS OF RMSE [PIXELS] AVERAGES OF THE THEMIS, THE HRSC AND ALL IMAGE PAIRS.

| Data | RMSE of R-MBD [pixels] | RMSE of W-MB [pixels] |
|---|---|---|
| Average on the 10 pairs of THEMIS images | 0.31 | 0.54 |
| Average on the 10 pairs of HRSC images | 0.22 | 0.59 |
| Average on all 20 pairs of images | 0.26 | 0.57 |

The RSMEs obtained by R-MBD and W-MBC are reported in Table 3 after averaging over the 10 pairs of images coming from THEMIS data, the 10 pairs from HRSC data, and all 20 images. In the step of feature-based registration, R-MBD and W-MBC were applied with crater-to-crater and crater-to-contour matching, respectively. The results obtained the other way around were similar and are omitted for brevity. Subpixel registration error was obtained by both methods in the application to both sensors. Especially small values of RMSE, around 0.2-0.3 pixels, were achieved by the R-MBD method, while slightly larger errors, around 0.5-0.6 pixels, were obtained by W-MBC method. The standard deviations of the RMSE values within the three considered sets of image pairs were very small (lower than 0.06 pixels) in all the cases.

Examples of mean RMSE for remote sensing image registration are reported to range between ~0.09 (which is expected as achieving good results—where 0.91 was obtained in prior art methods), and ~3.37 in the worst case. The examples reported also large values (e.g., ~23.05, ~18.22, or ~16.31) that may be related to experimental outliers. Moreover, the standard deviations of RMSE measured varied from 0.20 to 1.222. These results confirm the effectiveness of the present methods, not only for crater detection, but also for registering planetary data in both the visible and TIR ranges.

The present invention addresses registration in two stages. To appreciate the impact of this choice, the examples in FIGS. 9(a)-(b), were obtained by applying R-MBD to semi-synthetic pairs of images generated from an original HRSC image (1396×2334 pixels (FIG. 9(a)); and an original THEMIS image (1581×1827 pixels (FIG. 9(b)). In the background of each panel shown in FIGS. 9(a)-(b), the input and reference images are displayed through false color composites (R=input image; G=B=reference image) together before (left) and after registration (right). In the foreground of each panel, details of the input and reference images before (top) and after registration (bottom) are shown.

Details on the registration results are reported in Table 4.

TABLE 1

DETAILS ON THE REGISTRATION RESULTS IN FIG. 9

Figure 9A:
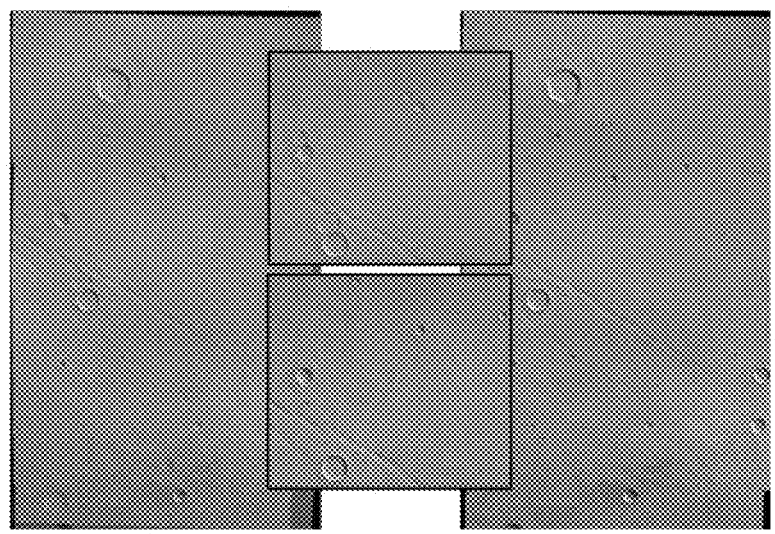
FIGS. 9(a)-(b) show the results of one embodiment of the present invention, using R-MBD when applied to the registration of semi-synthetic pairs of images obtained from HRSC (FIG. 9(a)) and THEMIS (FIG. 9(b)) data.
Figure 9B:
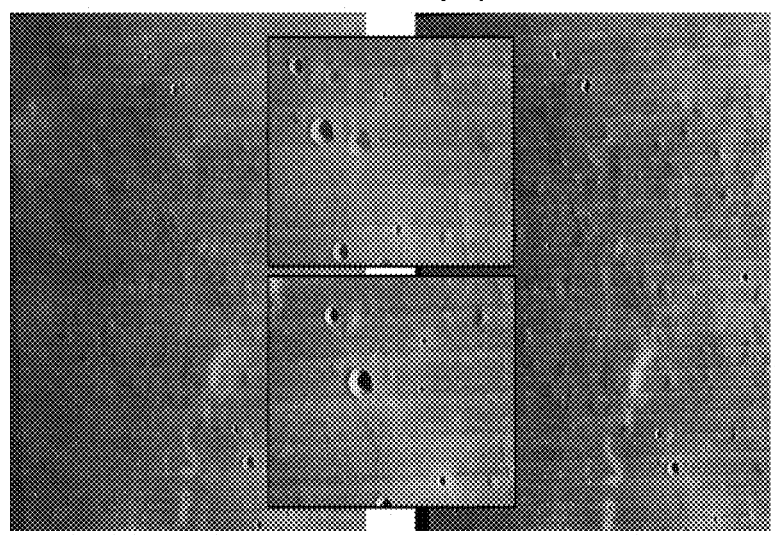

| Image pair | Transformation vector | | RMSE [pixels] | |
| --- | --- | --- | --- | --- |
| | $p_{GT}$ | p* | 1st Step | 2nd Step |
| FIG. 9(a) | (7.05, 35.91, 0.18°, 1.071) | (7.04, 35.92, 0.19°, 1.071) | 0.79 | 0.16 |
| FIG. 9(b) | (76.59, 19.96, 2.17°, 1.031) | (76.41, 20.06, 2.18°, 1.031) | 0.51 | 0.33 |

The first registration step, which performed a search in the entire space P of the admissible transformation vectors by matching the extracted spatial features, obtained sub-pixel registration error in itself already. The second step, which maximized mutual information restricting the search to a neighborhood of the first solution, further reduced RMSE to 0.16 and 0.33 pixels in the cases of HRSC and THEMIS data, respectively. On one hand, this example confirmed the effectiveness of using the extracted crater features as a basis for planetary image registration. On the other hand, it also pointed out, in the case of both sensors, the usefulness of the present two-step image registration methods.

The second (area-based) step allowed the result of the first (feature-based) step to be refined, the possible errors introduced by crater detection to be reduced, and the overall registration process to become more robust to the performance of the feature extraction process. It is also worth noting the very high similarity between the ground-truth transformation vector $p_{GT}$ and the vector p* computed by the proposed approach. Similar results were obtained by R-MBD on the other image pairs and the same comment on the relation between the two registration steps hold in the case of W-MBC as well.

Figure 10A:
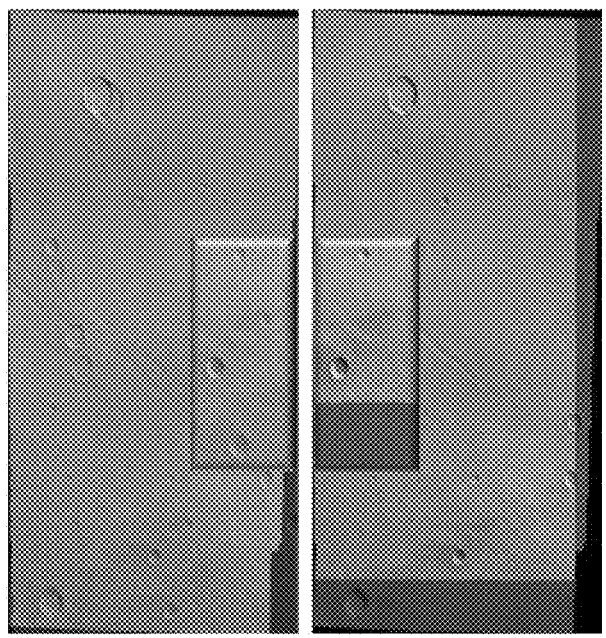
FIGS. 10(a)-(b) show the results of one embodiment of the present invention, using W-MBC when applied to the registration of the semi-synthetic pairs of images obtained from HRSC (FIG. 10(a)), and THEMIS (FIG. 10(b)) data.
Figure 10B:
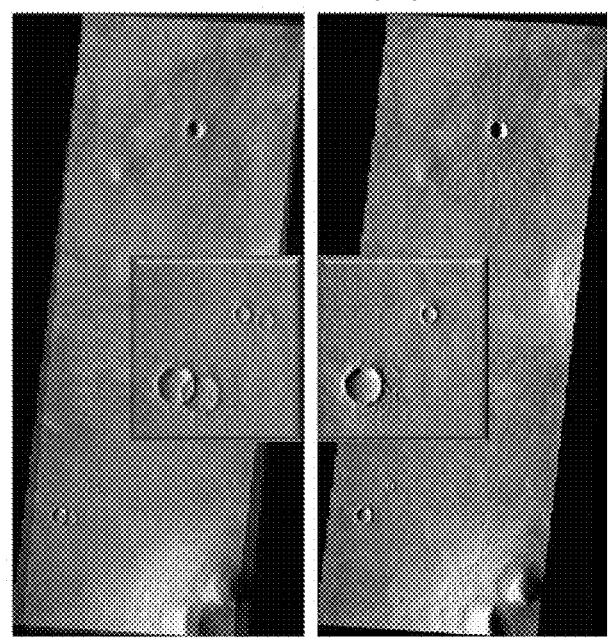

FIGS. 10(a)-(b) show the results of one embodiment of the present invention, using W-MBC when applied to the registration of the semi-synthetic pairs of images obtained from HRSC (FIG. 10(a)), and THEMIS (FIG. 10(b)) data, where the RMSEs were 0.18 and 0.64 pixels, respectively. In the background of each panel in FIGS. 10(a)-10(b), the input and reference images are displayed through false-color composites (R=B=input image; G=reference image) together before (left) and after registration (right). In the foreground of each panel, details of the input and reference images before (top) and after registration (bottom) are shown.

E. Real Multi-Temporal Registration Results

In the application of the present methods to the multi-temporal pair of real LROC images, the "true" transformation is obviously unknown. Hence, to evaluate the accuracy of the registration results, a visual analysis was conducted: a checkerboard image, where neighboring squares were taken from the images acquired at the two observation dates before and after registration, was composed. Cropped details are shown in FIGS. 11-13.

Figure 11A:
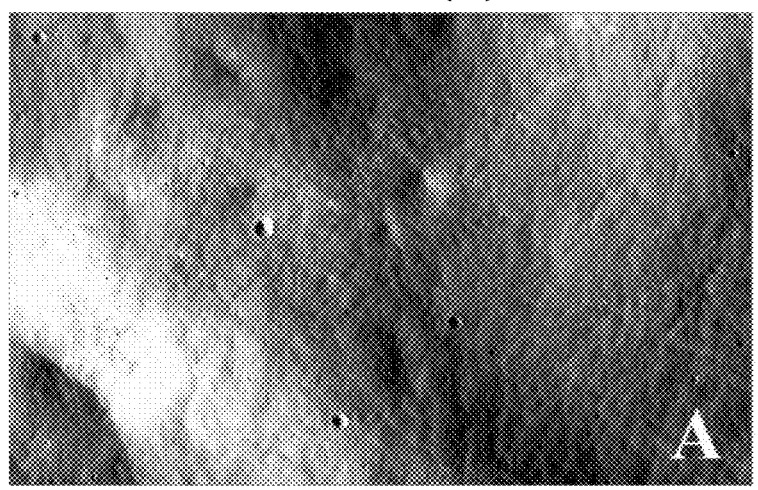
FIGS. 11(a)-(d) show the first cropped detail of the results of one embodiment of the present invention, where W-MBC is applied to the registration of the multitemporal pair of real Lunar Reconnaissance Orbiter Camera (LROC) images.
Figure 11B:
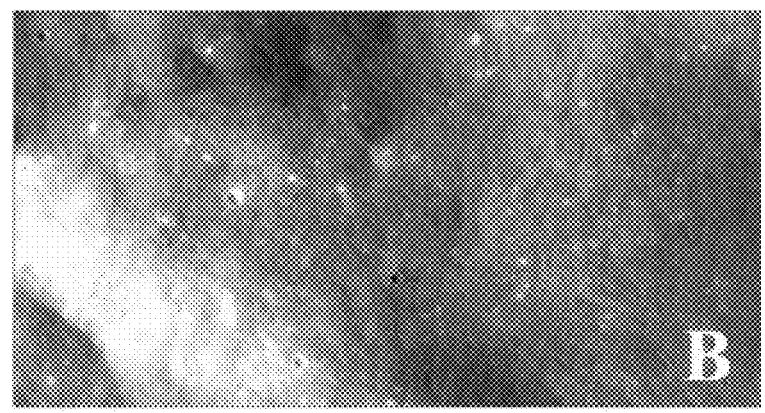
Figure 11C:
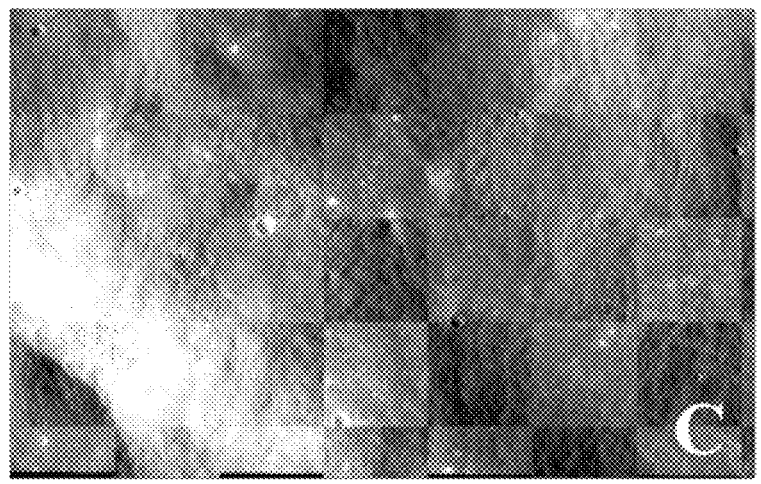
Figure 11D:
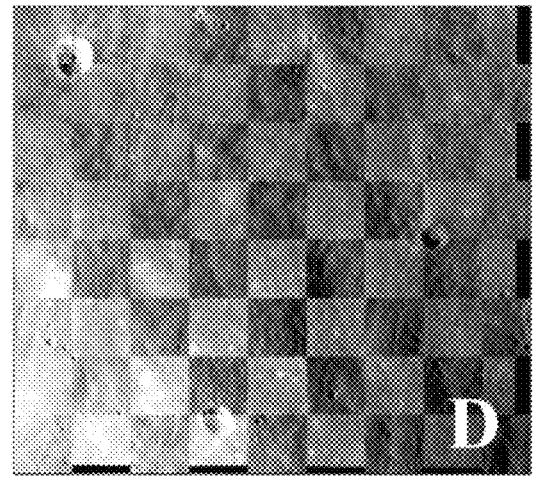

FIGS. 11(a)-(d) show the first cropped detail of the results of one embodiment of the present invention, where W-MBC is applied to the registration of the multitemporal pair of real Lunar Reconnaissance Orbiter Camera (LROC) images. FIG. 11(a) shows the reference image; FIG. 11(b) shows the input image; FIG. 11(c) shows the checkerboard composite of the reference and registered input images; FIG. 11(d) shows the zoom on a detail of the checkerboard composite of FIG. 11(c).

Figure 12A:
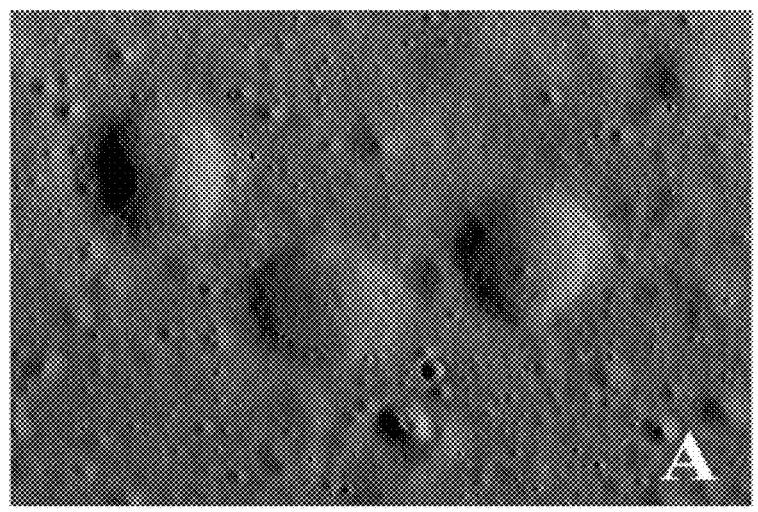
FIGS. 12(a)-(d) show the second cropped detail of the results of one embodiment of the present invention, where R-MBD is applied to the registration of the multitemporal pair of real Lunar Reconnaissance Orbiter Camera (LROC) images.
Figure 12B:
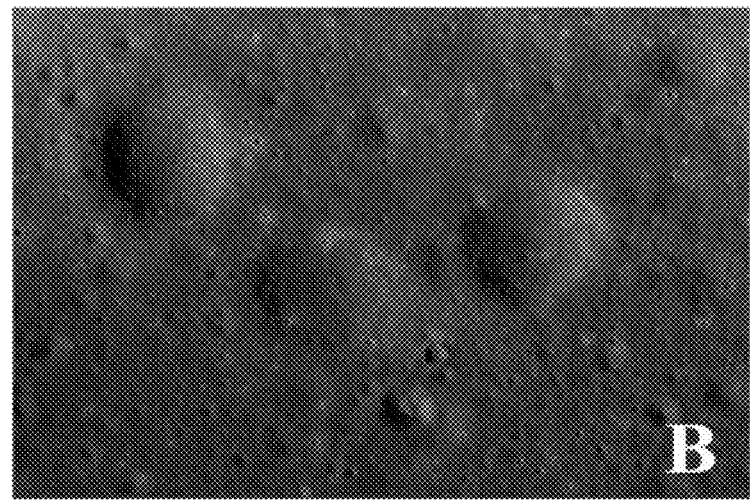
Figure 12C:
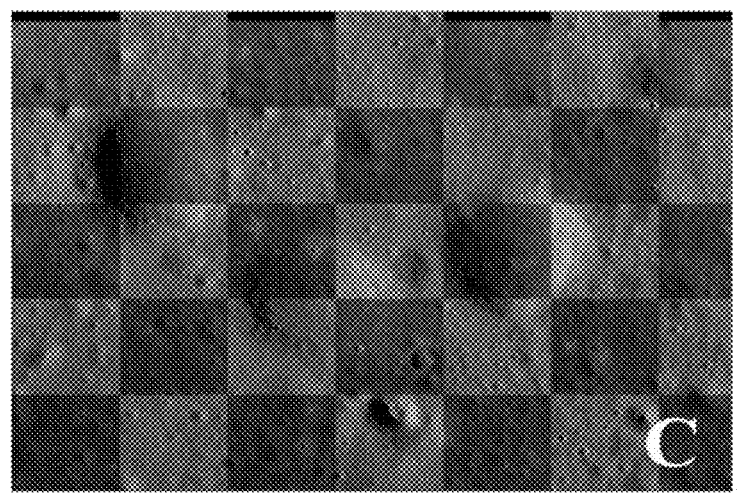
Figure 12D:
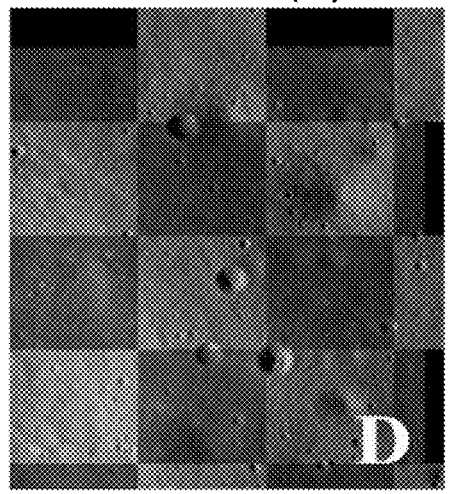

FIGS. 12(a)-(d) show the second cropped detail of the results of one embodiment of the present invention, where R-MBD is applied to the registration of the multitemporal pair of real Lunar Reconnaissance Orbiter Camera (LROC) images. FIG. 12(a) shows the reference image; FIG. 12(b) shows the input image; FIG. 12(c) shows the checkerboard composite of the reference and registered input images; FIG. 12(d) shows the zoom on a detail of the checkerboard composite of FIG. 12(c).

Figure 13A:
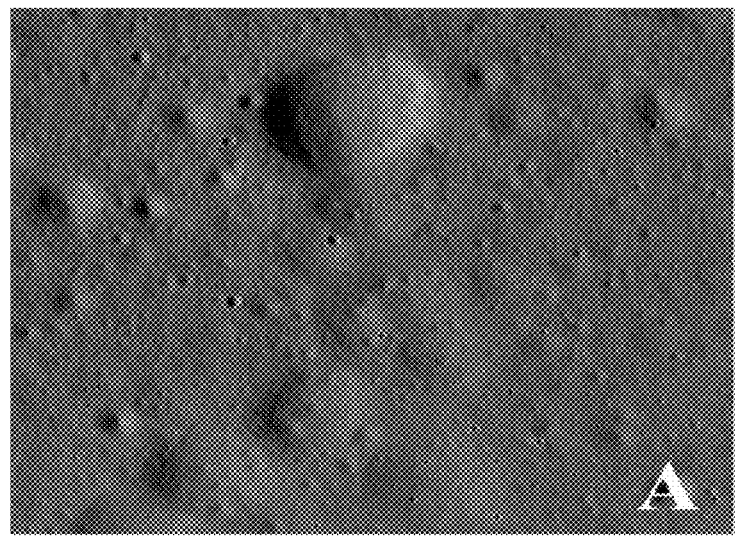
FIGS. 13(a)-(d) show the third cropped detail of the results of one embodiment of the present invention, where R-MBD is applied to the registration of the multitemporal pair of real Lunar Reconnaissance Orbiter Camera (LROC) images.
Figure 13B:
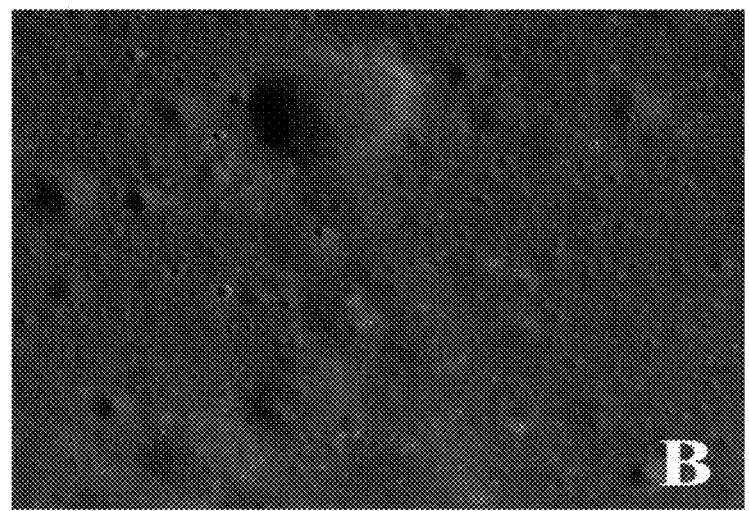
Figure 13C:
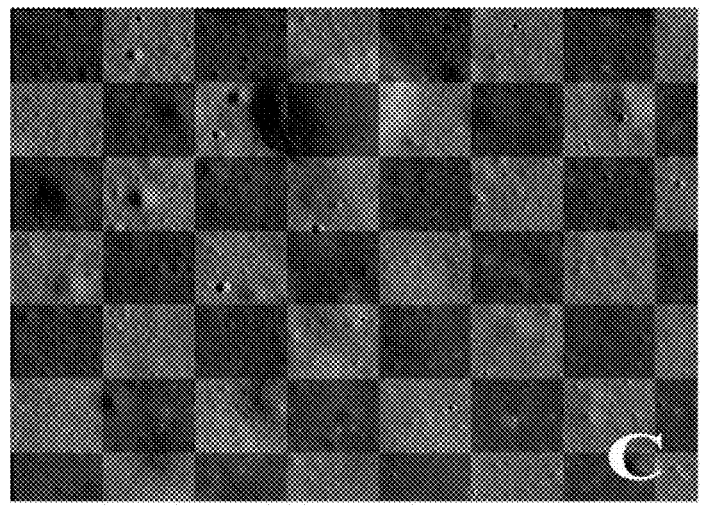
Figure 13D:
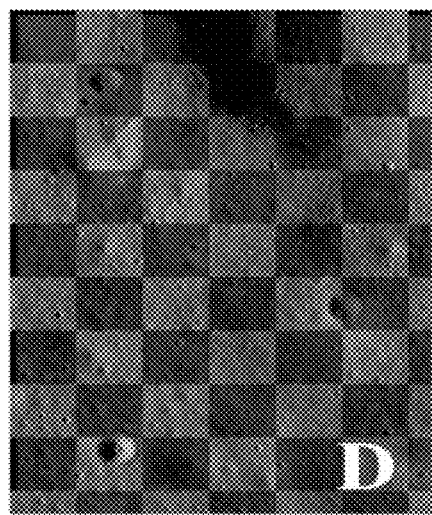

FIGS. 13(a)-(d) show the third cropped detail of the results of one embodiment of the present invention, where R-MBD is applied to the registration of the multitemporal pair of real Lunar Reconnaissance Orbiter Camera (LROC) images. FIG. 13(a) shows the reference image; FIG. 13(b) shows the input image; FIG. 13(c) shows the checkerboard composite of the reference and registered input images; FIG. 13(d) shows the zoom on a detail of the checkerboard composite of FIG. 13(c).

The R-MBD and W-MBC methods of the present invention obtained very similar registration results. In particular, the spatial consistency of the checkerboard composites after registration and the accurate continuity of the curvilinear features across the borders of adjacent squares visually emphasize the quality of the registration product. These qualitative results are consistent with the quantitative analysis conducted with semi-synthetic data and confirm the effectiveness of the proposed framework in the application to the registration of planetary images.

It is also worth noting that accurate results were obtained with the real multitemporal data set even though the input LROC images were characterized by strongly uneven illumination across the scene (see FIGS. 11 and 12)—a result that suggests the robustness of the present invention to the radiometric differences between the input images to be registered.

Concerning image registration, the performances of both techniques of the present invention have been evaluated quantitatively using semi-synthetic image pairs coming from Mars data and qualitatively using real multi-temporal Lunar data. In the first case, subpixel accuracy was achieved with all considered image pairs and, similarly to the case of crater detection, R-MBD and W-MBC have differed in accuracy and convergence speed. In the case of registration, the multiscale wavelet approach incorporated in W-MBC has led to especially efficient computation, while the R-MBD method obtained smaller registration errors. Operatively, this scenario allows choosing between two possibilities depending on the application requirements. In particular, the quantitative experimental results confirmed the present invention's novel two-step registration process: first, matching the extracted curvilinear features; then, refining using area-based mutual information. On one hand, while the former step achieved subpixel registration per se, the latter proved able to reduce the error even further. On the other hand, the two-step process allowed alleviating the usually heavy computational burden associates with mutual information methods for registration.

Quantitative performance assessment with respect to ground truth data was unfeasible in the case of the experiments with real multitemporal Lunar images. Nevertheless, a visual analysis of the results pointed out that remarkable precision was obtained by both the present registration methods in this case as well, with no significant accuracy differences between them. The input multitemporal image pair was characterized by strongly uneven illumination, and the accurate performance of the present framework suggested its robustness to illumination issues—an important property in planetary image applications.

It should be emphasized that the above-described embodiments of the invention are merely possible examples of implementations set forth for a clear understanding of the principles of the invention. Variations and modifications may be made to the above-described embodiments of the invention without departing from the spirit and principles of the invention. All such modifications and variations are intended to be included herein within the scope of the invention and protected by the following claims.

What is claimed is:

1. A method of detecting craters on a planetary surface, the method comprising:
    capturing images of a planetary surface using a sensor, as input images;
    cropping said input images and reference images using a pre-processing module;
    reducing noise and extracting contours from said input images and said reference images using said pre-processing module;
    performing data reduction and transformation of image data from said preprocessing module using a crater extraction module, and performing energy minimization on said input images and said reference images using marked point processes, combined with both a multiple-birth-and-death and a multiple-birth-and-cut method;
    performing a first registration using said crater extraction module, by crater-to-contour registration and crater-to-crater registration,
        wherein said crater-to-contour registration includes matching the craters extracted from said reference images with edge contours extracted from said input images, and
        wherein crater-to-crater registration includes matching the craters extracted from both said reference images and said input images using a mean-directed Hausdorff distance; and
    performing a second registration using a mutual information-based image registration module, by maximizing mutual information between said reference images and said input images to achieve a final transformation and registered images.

2. The method of claim 1, wherein said data reduction and transformation is performed using both a region of interest and a discrete wavelet transform method.

3. The method of claim 2, wherein said multiple-birth-and-death (MBD) method and said multiple-birth-and-cut (MBC) method are performed after said region of interest method.

4. The method of claim 3, wherein said discrete wavelet transform method is used with said multiple-birth-and-cut (MBC) method, where a multiscale pyramidal decomposition method is used iteratively on said input images of progressively smaller size and coarser resolution, to achieve refine said input images.

5. The method of claim 4, the method further comprising:
    applying a marked point process (MPP) to contour images achieved by said data reduction and transformation of said input images and said reference images.

6. The method of claim 5, wherein said crater-to-crater registration includes mapping of said reference images and said input images to be registered, as a rotational scale translation (RST), by using a combination of generic algorithms, simulated annealing, and generalized pattern searching.

7. The method of claim 6, wherein said second registration includes maximization of mutual information between said reference images and said input images by using a combination of generic algorithms, simulated annealing, and generalized pattern searching.

8. The method of claim 1, wherein said cropping of said input images and said reference images removes artifacts and border effects.

* * * * *